United States Patent
Kim et al.

(10) Patent No.: US 10,430,691 B1
(45) Date of Patent: *Oct. 1, 2019

(54) LEARNING METHOD AND LEARNING DEVICE FOR OBJECT DETECTOR BASED ON CNN, ADAPTABLE TO CUSTOMERS' REQUIREMENTS SUCH AS KEY PERFORMANCE INDEX, USING TARGET OBJECT MERGING NETWORK AND TARGET REGION ESTIMATING NETWORK, AND TESTING METHOD AND TESTING DEVICE USING THE SAME TO BE USED FOR MULTI-CAMERA OR SURROUND VIEW MONITORING

(71) Applicant: Stradvision, Inc., Gyeongbuk (KR)

(72) Inventors: Kye-Hyeon Kim, Seoul (KR); Yongjoong Kim, Gyeongsangbuk-do (KR); Insu Kim, Gyeongsangbuk-do (KR); Hak-Kyoung Kim, Gyeongsangbuk-do (KR); Woonhyun Nam, Gyeongsangbuk-do (KR); SukHoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongbuk (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/254,541

(22) Filed: Jan. 22, 2019

(51) Int. Cl.
*G06K 9/46* (2006.01)
*G06K 9/62* (2006.01)
(Continued)

(52) U.S. Cl.
CPC ......... *G06K 9/6257* (2013.01); *G06K 9/4642* (2013.01); *G06K 9/6262* (2013.01); *G06N 3/084* (2013.01); *G06N 7/005* (2013.01)

(58) Field of Classification Search
CPC .. G06K 9/6257; G06K 9/4642; G06K 9/6262; G06N 3/04; G06N 7/005
See application file for complete search history.

(56) References Cited

U.S. PATENT DOCUMENTS 10,169,679 B1 * 1/2019 Kim .................... G06K 9/6256
10,185,878 B2 * 1/2019 Liu ..................... G06K 9/00369
(Continued)

OTHER PUBLICATIONS

Liu, J., Wang, D., Lu, L., Wei, Z., Kim, L., Turkbey, E. B., Sahiner, B., Petrick, N. A. and Summers, R. M. (2017), Detection and diagnosis of colitis on computed tomography using deep convolutional neural networks. Med. Phys., 44: 4630-4642. doi:10.1002/mp.12399 (Year: 2017).*

Primary Examiner — Utpal D Shah
(74) Attorney, Agent, or Firm — Husch Blackwell LLP

(57) ABSTRACT

A method for learning parameters of an object detector based on a CNN adaptable to customers' requirements such as KPI by using a target object merging network and a target region estimating network is provided. The CNN can be redesigned when scales of objects change as a focal length or a resolution changes depending on the KPI. The method includes steps of: a learning device (i) instructing the target region estimating network to search for k-th estimated target regions, (ii) instructing an RPN to generate (k_1)-st to (k_n)-th object proposals, corresponding to an object on a (k_1)-st to a (k_n)-th manipulated images, and (iii) instructing the target object merging network to merge the object proposals and merge (k_1)-st to (k_n)-th object detection information, outputted from an FC layer. The method can be useful for multi-camera, SVM (surround view monitor), and the like, as accuracy of 2D bounding boxes improves.

28 Claims, 8 Drawing Sheets
(3 of 8 Drawing Sheet(s) Filed in Color)

(51) Int. Cl.
*G06N 3/08* (2006.01)
*G06N 7/00* (2006.01)

(56) References Cited

U.S. PATENT DOCUMENTS

| | | | |
|---|---|---|---|
| 2016/0035078 A1* | 2/2016 | Lin | G06T 7/0002 |
| | | | 382/157 |
| 2017/0124415 A1* | 5/2017 | Choi | G06N 3/08 |
| 2017/0147905 A1* | 5/2017 | Huang | G06K 9/6232 |
| 2017/0220904 A1* | 8/2017 | Bai | G06K 9/4604 |
| 2018/0039853 A1* | 2/2018 | Liu | G06N 3/0454 |
| 2018/0039864 A1* | 2/2018 | Yao | G06K 9/38 |
| 2018/0068198 A1* | 3/2018 | Sawides | G06K 9/3233 |
| 2018/0096457 A1* | 4/2018 | Savvides | G06K 9/6267 |
| 2018/0129906 A1* | 5/2018 | Habibian | G06K 9/4628 |
| 2018/0137350 A1* | 5/2018 | Such | G06K 9/00463 |
| 2018/0158189 A1* | 6/2018 | Yedla | G06T 7/11 |
| 2018/0165551 A1* | 6/2018 | Roh | G06K 9/3233 |
| 2018/0195977 A1* | 7/2018 | Wang | G01V 5/0016 |
| 2018/0253622 A1* | 9/2018 | Chen | G06K 9/4671 |
| 2018/0260414 A1* | 9/2018 | Gordo Soldevila | |
| | | | G06N 3/0445 |
| 2018/0260415 A1* | 9/2018 | Gordo Soldevila | |
| | | | G06K 9/4628 |
| 2018/0276454 A1* | 9/2018 | Han | G06K 9/00255 |
| 2018/0285686 A1* | 10/2018 | Pinheiro | G06F 15/76 |
| 2018/0315154 A1* | 11/2018 | Park | G06T 1/20 |
| 2019/0012802 A1* | 1/2019 | Liu | G06T 7/73 |
| 2019/0019037 A1* | 1/2019 | Kadav | G06K 9/00744 |
| 2019/0050694 A1* | 2/2019 | Fukagai | G06K 9/66 |
| 2019/0050728 A1* | 2/2019 | Sim | G06N 3/08 |
| 2019/0050994 A1* | 2/2019 | Fukagai | G06T 7/20 |
| 2019/0057507 A1* | 2/2019 | El-Khamy | G06T 7/11 |
| 2019/0065897 A1* | 2/2019 | Li | G06K 9/628 |

\* cited by examiner

US 10,430,691 B1

LEARNING METHOD AND LEARNING DEVICE FOR OBJECT DETECTOR BASED ON CNN, ADAPTABLE TO CUSTOMERS' REQUIREMENTS SUCH AS KEY PERFORMANCE INDEX, USING TARGET OBJECT MERGING NETWORK AND TARGET REGION ESTIMATING NETWORK, AND TESTING METHOD AND TESTING DEVICE USING THE SAME TO BE USED FOR MULTI-CAMERA OR SURROUND VIEW MONITORING

FIELD OF THE DISCLOSURE

The present disclosure relates to a method for learning parameters of an object detector based on a CNN, which is adaptable to customers' requirements such as key performance index, by using a target object merging network and a target region estimating network to be used for multi-camera or surround view monitoring; and more particularly, to the method for learning the parameters of the object detector based on the CNN by using the target object merging network and the target region estimating network, including steps of: (a) if at least one training video is acquired, (i) instructing an image-manipulating network to generate a (1_1)-st manipulated image to a (1_n)-th manipulated image corresponding to first estimated target regions, where each of at least one target objects is estimated as located, on each of a (1_1)-st image to a (1_n)-th image included in a first image pyramid corresponding to a first frame which is a current frame of the training video, and generate a first integrated training image by concatenating the (1_1)-st manipulated image to the (1_n)-th manipulated image, (ii) instructing one or more convolutional layers to apply one or more convolution operations to the first integrated training image, to thereby generate a first feature map, instructing an RPN to generate (1_1)-st object proposals to (1_n)-th object proposals, corresponding to the target object located on each of the (1_1)-st manipulated image to the (1_n)-th manipulated image in the first integrated training image by using the first feature map, instructing a pooling layer to generate a first pooled feature map by applying one or more pooling operations to one or more regions, corresponding to the (1_1)-st object proposals to the (1_n)-th object proposals, on the first feature map, and instructing an FC layer to apply at least one fully connected operation to the first pooled feature map, to thereby generate (1_1)-st object detection information to (1_n)-th object detection information, corresponding to the target object, and (iii) instructing the target object merging network to generate first merged object proposals by merging the (1_1)-st object proposals to the (1_n)-th object proposals, and generate first merged object detection information by merging the (1_1)-st object detection information to the (1_n)-th object detection information, and instructing an FC loss layer to calculate one or more first FC losses by referring to the first merged object detection information and its corresponding GT, to thereby learn at least part of parameters of the FC layer and the convolutional layers by backpropagating the first FC losses; and (b) (i) instructing the target object estimating network to search for (k-1)-th target regions, where the target object is estimated as located, on the (k-1)-th frame by referring to {(k-1)_1}-st object proposals to {(k-1)_n}-th object proposals on a (k-1)-th integrated training image, and instructing the target region estimating network to search for k-th estimated target regions, corresponding to one or more regions, where the (k-1)-th target regions are estimated as located, on a k-th frame, (ii) instructing the image-manipulating network to generate a (k_1)-st manipulated image to a (k_n)-th manipulated image corresponding to the k-th estimated target regions, on each of a (k_1)-st image to a (k_n)-th image included in a k-th image pyramid corresponding to the k-th frame, and generate a k-th integrated training image by concatenating the (k_1)-st manipulated image to the (k_n)-th manipulated image, (iii) instructing the convolutional layers to apply the convolution operations to the k-th integrated training image, to thereby generate a k-th feature map, instructing the RPN to generate (k_1)-st object proposals to (k_n)-th object proposals, corresponding to the target object located on each of the (k_1)-st manipulated image to the (k_n)-th manipulated image in the k-th integrated training image by using the k-th feature map, instructing the pooling layer to generate a k-th pooled feature map by applying the pooling operations to one or more regions, corresponding to the (k_1)-st object proposals to the (k_n)-th object proposals, on the k-th feature map, and instructing the FC layer to apply the fully connected operation to the k-th pooled feature map, to thereby generate (k_1)-st object detection information to (k_n)-th object detection information, corresponding to the target object, and (iv) instructing the target object merging network to generate k-th merged object proposals by merging the (k_1)-st object proposals to the (k_n)-th object proposals, and generate k-th merged object detection information by merging the (k_1)-st object detection information to the (k_n)-th object detection information, and instructing the FC loss layer to calculate one or more k-th FC losses by referring to the k-th merged object detection information and its corresponding GT, to thereby learn at least part of parameters of the FC layer and the convolutional layers by backpropagating the k-th FC losses, by increasing k from 2 to n, and a learning device, a testing method, and a testing device using the same.

BACKGROUND OF THE DISCLOSURE

In machine learning, a convolutional neural network (CNN, or ConvNet) is a class of deep, feed-forward artificial neural network that has successfully been applied to analyzing visual imagery.

A CNN-based object detector may (i) instruct one or more convolutional layers to apply convolution operations to an input image, to thereby generate a feature map corresponding to the input image, (ii) instruct an RPN (Region Proposal Network) to identify proposals corresponding to an object in the input image by using the feature map, (iii) instruct a pooling layer to apply at least one pooling operation to areas, corresponding to the identified proposals, on the feature map, to thereby generate one or more pooled feature maps, and (iv) instruct an FC (Fully Connected) layer to apply at least one fully connected operation to the acquired pooled feature maps to output class information and regression information for the object, to thereby detect the object on the input image.

However, since the CNN-based object detector uses the feature map whose size is reduced from a size of the input image by the convolutional layer, although large-sized objects in the input image can be easily detected, it is difficult to detect a small-sized object in the input image.

That is, if there are multiple target regions corresponding to one or more objects as subjects to be detected in the input image, desired features may not be extracted accurately from some of target regions due to small sizes thereof, and as a result, certain objects cannot be detected.

Such a problem may be resolved by object detection via cropping each of the target regions in each of the images among an image pyramid derived from the input image, but in this case, the object detection must be performed for each of the cropped images corresponding to the target regions, thus computational load may increase.

In addition to this, a CNN operation is a block operation, e.g., an operation by a unit of 32, 64, 128, etc., for fast calculation, but if an input image whose width or height is not a multiple of the unit is acquired, one or more padding regions must be added to make it a multiple of the unit, but this becomes a burden to the CNN operation. As a result, the more there are cropped images whose width or height that is not a multiple of the unit, the heavier the burden on the CNN, which slows down the calculation speed of the CNN.

Accordingly, the inventors of the present disclosure propose a learning method, a learning device for efficiently detecting objects and reducing computational time of the CNN, by using the target regions corresponding to the objects with various sizes in the input image, and a testing method and a testing device using the same.

SUMMARY OF THE DISCLOSURE

It is an object of the present disclosure to solve all the aforementioned problems.

It is another object of the present disclosure to provide an object detector based on a CNN capable of efficiently detecting objects in an image without regard to their sizes.

It is still another object of the present disclosure to provide the object detector based on the CNN capable of detecting the objects on the image without additional computational load.

It is still yet another object of the present disclosure to provide the object detector based on the CNN capable of efficiently detecting the objects and reducing computational time of the CNN, by using target regions corresponding to the objects with various sizes in the input image.

In accordance with one aspect of the present disclosure, there is provided a method for learning parameters of an object detector based on a CNN by using a target object merging network and a target region estimating network, including steps of: (a) a learning device, if at least one training video is acquired, (i) instructing an image-manipulating network to generate a (1_1)-st manipulated image to a (1_n)-th manipulated image corresponding to first estimated target regions, where each of at least one target objects is estimated as located, on each of a (1_1)-st image to a (1_n)-th image included in a first image pyramid corresponding to a first frame which is a current frame of the training video, and generate a first integrated training image by concatenating the (1_1)-st manipulated image to the (1_n)-th manipulated image, (ii) instructing one or more convolutional layers to apply one or more convolution operations to the first integrated training image, to thereby generate a first feature map, instructing an RPN to generate (1_1)-st object proposals to (1_n)-th object proposals, corresponding to the target object located on each of the (1_1)-st manipulated image to the (1_n)-th manipulated image in the first integrated training image by using the first feature map, instructing a pooling layer to generate a first pooled feature map by applying one or more pooling operations to one or more regions, corresponding to the (1_1)-st object proposals to the (1_n)-th object proposals, on the first feature map, and instructing an FC layer to apply at least one fully connected operation to the first pooled feature map, to thereby generate (1_1)-st object detection information to (1_n)-th object detection information, corresponding to the target object, and (iii) instructing the target object merging network to generate first merged object proposals by merging the (1_1)-st object proposals to the (1_n)-th object proposals, and generate first merged object detection information by merging the (1_1)-st object detection information to the (1_n)-th object detection information, and instructing an FC loss layer to calculate one or more first FC losses by referring to the first merged object detection information and its corresponding GT, to thereby learn at least part of parameters of the FC layer and the convolutional layers by backpropagating the first FC losses; and (b) the learning device (i) instructing the target object estimating network to search for (k−1)-th target regions, where the target object is estimated as located, on the (k−1)-th frame by referring to {(k−1)_1}-st object proposals to {(k−1)_n}-th object proposals on a (k−1)-th integrated training image, and instructing the target region estimating network to search for k-th estimated target regions, corresponding to one or more regions, where the (k−1)-th target regions are estimated as located, on a k-th frame, (ii) instructing the image-manipulating network to generate a (k_1)-st manipulated image to a (k_n)-th manipulated image corresponding to the k-th estimated target regions, on each of a (k_1)-st image to a (k_n)-th image included in a k-th image pyramid corresponding to the k-th frame, and generate a k-th integrated training image by concatenating the (k_1)-st manipulated image to the (k_n)-th manipulated image, (iii) instructing the convolutional layers to apply the convolution operations to the k-th integrated training image, to thereby generate a k-th feature map, instructing the RPN to generate (k_1)-st object proposals to (k_n)-th object proposals, corresponding to the target object located on each of the (k_1)-st manipulated image to the (k_n)-th manipulated image in the k-th integrated training image by using the k-th feature map, instructing the pooling layer to generate a k-th pooled feature map by applying the pooling operations to one or more regions, corresponding to the (k_1)-st object proposals to the (k_n)-th object proposals, on the k-th feature map, and instructing the FC layer to apply the fully connected operation to the k-th pooled feature map, to thereby generate (k_1)-st object detection information to (k_n)-th object detection information, corresponding to the target object, and (iv) instructing the target object merging network to generate k-th merged object proposals by merging the (k_1)-st object proposals to the (k_n)-th object proposals, and generate k-th merged object detection information by merging the (k_1)-st object detection information to the (k_n)-th object detection information, and instructing the FC loss layer to calculate one or more k-th FC losses by referring to the k-th merged object detection information and its corresponding GT, to thereby learn at least part of parameters of the FC layer and the convolutional layers by backpropagating the k-th FC losses, by increasing k from 2 to n.

As one example, at the step of (a), the learning device instructs an RPN loss layer to calculate one or more first RPN losses by referring to information on the first merged object proposals and their corresponding GTs, to thereby adjust at least part of parameters of the RPN by backpropagating the first RPN losses, and, at the step of (b), the learning device instructs the RPN loss layer to calculate one or more k-th RPN losses by referring to information on the k-th merged object proposals and their corresponding GTs, to thereby adjust at least part of the parameters of the RPN by backpropagating the k-th RPN losses.

As one example, at the step of (a), the learning device instructs the image-manipulating network to adjust at least one of widths and lengths of the (1_1)-st manipulated image to the (1_n)-th manipulated image to be identical, and concatenates the (1_1)-st adjusted manipulated image to the (1_n)-th adjusted manipulated image in a direction of the widths or the lengths which are adjusted to be identical, and, at the step of (b), the learning device instructs the image-manipulating network to adjust at least one of widths and lengths of the (k_1)-st manipulated image to the (k_n)-th manipulated image to be identical, and concatenates the (k_1)-st adjusted manipulated image to the (k_n)-th adjusted manipulated image in a direction of the widths or the lengths which are adjusted to be identical.

As one example, the learning device instructs the image-manipulating network to add at least one zero padding region in-between each pair comprised of two neighboring adjusted manipulated images which are concatenated, among the (k_1)-st adjusted manipulated image to the (k_n)-th adjusted manipulated image, wherein the integrated training image is reduced by a ratio of 1/S by multiple convolution operations of the convolutional layers, and wherein, if a maximum size of each kernel of each of the convolutional layers is K×K, a distance in-between said each pair comprised of the two neighboring adjusted manipulated images is determined as S×(K−1)/2.

As one example, supposing that at least one specific identical object is located on each of a first specific manipulated image and a second specific manipulated image, and that at least one object proposal, corresponding to the specific identical object, on the first specific manipulated image, is a first specific object proposal, and that at least one object proposal, corresponding to the specific identical object, on the second specific manipulated image, is a second specific object proposal, the learning device instructs the target object merging network to determine whether an IOU between the first specific object proposal and the second specific object proposal is equal to or greater than a first threshold, then (I) if the IOU is determined as less than the first threshold, calculates an adjusted IOU between an area, corresponding to the first specific object proposal, on the second specific manipulated image and an area, corresponding to the second specific object proposal, on the first specific manipulated image, and (II) if the adjusted IOU is determined as equal to or greater than a second threshold, selects (i) one of a higher probability among the first specific object proposal and the second specific object proposal, or (ii) one of a larger area calculated on the training image among the first specific object proposal and the second specific object proposal, to thereby output the selected one as a specific merged object proposal corresponding to the specific identical object, wherein the IOU is an intersection over union.

As one example, supposing that at least one specific identical object is located on each of a first specific manipulated image and a second specific manipulated image, and that at least one object bounding box, corresponding to the specific identical object, on the first specific manipulated image, is a first specific object bounding box, and that at least one object bounding box, corresponding to the specific identical object, on the second specific manipulated image, is a second specific object bounding box, the learning device instructs the target object merging network to determine whether an IOU between the first specific object bounding box and the second specific object bounding box is equal to or greater than a first threshold, then (I) if the IOU is determined as less than the first threshold, calculates an adjusted IOU between an area, corresponding to the first specific object bounding box, on the second specific manipulated image and an area, corresponding to the second specific object bounding box, on the first specific manipulated image, and (II) if the adjusted IOU is determined as equal to or greater than a second threshold, selects (i) one of a higher probability among the first specific object bounding box and the second specific object bounding box, or (ii) one of a larger area calculated on the training image among the first specific object bounding box and the second specific object bounding box, to thereby output the selected one as a specific merged object detection information corresponding to the specific identical object, wherein the IOU is an intersection over union.

As one example, at the step of (b), the learning device instructs the target object estimating network to (i) divide a specific manipulated image into an M×N grid, (ii) generate at least one histogram map representing the number of each of corresponding specific object proposals, among the (k_1)-st object proposals to the (k_n)-th object proposals, per each cell of the grid, wherein each partial area or each whole area of said each of corresponding specific proposals is present in its corresponding cell of the grid, and (iii) determine at least one specific target region by using at least one region of a moving window, wherein the at least one region has a largest value of summation of the histogram map among all regions to be occupied by changing a location of the moving window.

In accordance with another aspect of the present disclosure, there is provided a method for testing an object detector based on a CNN by using a target object merging network and a target region estimating network, including steps of: (a) on condition that a learning device has performed processes of (1) (i) instructing an image-manipulating network to generate a (1_1)-st manipulated image for training to a (1_n)-th manipulated image for training corresponding to first estimated target regions for training, where each of at least one target objects for training is estimated as located, on each of a (1_1)-st training image to a (1_n)-th training image included in a first image pyramid for training corresponding to a first frame for training which is a current frame of at least one training video, and generate a first integrated training image by concatenating the (1_1)-st manipulated image for training to the (1_n)-th manipulated image for training, (ii) instructing one or more convolutional layers to apply one or more convolution operations to the first integrated training image, to thereby generate a first feature map for training, instructing an RPN to generate (1_1)-st object proposals for training to (1_n)-th object proposals for training, corresponding to the target object for training located on each of the (1_1)-st manipulated image for training to the (1_n)-th manipulated image for training in the first integrated training image by using the first feature map for training, instructing a pooling layer to generate a first pooled feature map for training by applying one or more pooling operations to one or more regions, corresponding to the (1_1)-st object proposals for training to the (1_n)-th object proposals for training, on the first feature map for training, and instructing an FC layer to apply at least one fully connected operation to the first pooled feature map for training, to thereby generate (1_1)-st object detection information for training to (1_n)-th object detection information for training, corresponding to the target object for training, and (iii) instructing the target object merging network to generate first merged object proposals for training by merging the (1_1)-st object proposals for training to the (1_n)-th object proposals for training, and generate first merged object detection information for training by merging the (1_1)-st object detection information for training to the (1_n)-th object detection information for training, and instructing an FC loss layer to calculate one or more first FC losses by referring to the first merged object detection information for training and its corresponding GT, to thereby learn at least part of parameters of the FC layer and the convolutional layers by backpropagating the first FC losses, and (2) (i) instructing the target object estimating network to search for (k−1)-th target regions for training, where the target object for training is estimated as located, on the (k−1)-th frame for training by referring to {(k−1)_1}-st object proposals for training to {(k−1)_n}-th object proposals for training on a (k−1)-th integrated training image, and instructing the target region estimating network to search for k-th estimated target regions for training, corresponding to one or more regions, where the (k−1)-th target regions for training are estimated as located, on a k-th frame for training, (ii) instructing the image-manipulating network to generate a (k_1)-st manipulated image for training to a (k_n)-th manipulated image for training corresponding to the k-th estimated target regions for training, on each of a (k_1)-st training image to a (k_n)-th training image included in a k-th image pyramid for training corresponding to the k-th frame for training, and generate a k-th integrated training image by concatenating the (k_1)-st manipulated image for training to the (k_n)-th manipulated image for training, (iii) instructing the convolutional layers to apply the convolution operations to the k-th integrated training image, to thereby generate a k-th feature map for training, instructing the RPN to generate (k_1)-st object proposals for training to (k_n)-th object proposals for training, corresponding to the target object for training located on each of the (k_1)-st manipulated image for training to the (k_n)-th manipulated image for training in the k-th integrated training image by using the k-th feature map for training, instructing the pooling layer to generate a k-th pooled feature map for training by applying the pooling operations to one or more regions, corresponding to the (k_1)-st object proposals for training to the (k_n)-th object proposals for training, on the k-th feature map for training, and instructing the FC layer to apply the fully connected operation to the k-th pooled feature map for training, to thereby generate (k_1)-st object detection information for training to (k_n)-th object detection information for training, corresponding to the target object for training, and (iv) instructing the target object merging network to generate k-th merged object proposals for training by merging the (k_1)-st object proposals for training to the (k_n)-th object proposals for training, and generate k-th merged object detection information for training by merging the (k_1)-st object detection information for training to the (k_n)-th object detection information for training, and instructing the FC loss layer to calculate one or more k-th FC losses by referring to the k-th merged object detection information for training and its corresponding GT, to thereby learn at least part of parameters of the FC layer and the convolutional layers by backpropagating the k-th FC losses, by increasing k from 2 to n; a testing device, if at least one test video is acquired, (i) instructing the image-manipulating network to generate a (1_1)-st manipulated image for testing to a (1_n)-th manipulated image for testing corresponding to first estimated target regions for testing, where each of at least one target objects for testing is estimated as located, on each of a (1_1)-st test image to a (1_n)-th test image included in a first image pyramid for testing corresponding to a first frame for testing which is a current frame of the test video, and generate a first integrated test image by concatenating the (1_1)-st manipulated image for testing to the (1_n)-th manipulated image for testing, (ii) instructing the convolutional layers to apply the convolution operations to the first integrated test image, to thereby generate a first feature map for testing, instructing the RPN to generate (1_1)-st object proposals for testing to (1_n)-th object proposals for testing, corresponding to the target object for testing located on each of the (1_1)-st manipulated image for testing to the (1_n)-th manipulated image for testing in the first integrated test image by using the first feature map for testing, instructing the pooling layer to generate a first pooled feature map for testing by applying the pooling operations to one or more regions, corresponding to the (1_1)-st object proposals for testing to the (1_n)-th object proposals for testing, on the first feature map for testing, and instructing the FC layer to apply the fully connected operation to the first pooled feature map for testing, to thereby generate (1_1)-st object detection information for testing to (1_n)-th object detection information for testing, corresponding to the target object for testing, and (iii) instructing the target object merging network to generate first merged object proposals for testing by merging the (1_1)-st object proposals for testing to the (1_n)-th object proposals for testing, and generate first merged object detection information for testing by merging the (1_1)-st object detection information for testing to the (1_n)-th object detection information for testing; and (b) the testing device (i) instructing the target object estimating network to search for (k−1)-th target regions for testing, where the target object for testing is estimated as located, on the (k−1)-th frame for testing by referring to {(k−1)_1}-st object proposals for testing to {(k−1)_n}-th object proposals for testing on a (k−1)-th integrated test image, and instructing the target region estimating network to search for k-th estimated target regions for testing, corresponding to one or more regions, where the (k−1)-th target regions for testing are estimated as located, on a k-th frame for testing, (ii) instructing the image-manipulating network to generate a (k_1)-st manipulated image for testing to a (k_n)-th manipulated image for testing corresponding to the k-th estimated target regions for testing, on each of a (k_1)-st test image to a (k_n)-th test image included in a k-th image pyramid for testing corresponding to the k-th frame for testing, and generate a k-th integrated test image by concatenating the (k_1)-st manipulated image for testing to the (k_n)-th manipulated image for testing, (iii) instructing the convolutional layers to apply the convolution operations to the k-th integrated test image, to thereby generate a k-th feature map for testing, instructing the RPN to generate (k_1)-st object proposals for testing to (k_n)-th object proposals for testing, corresponding to the target object for testing located on each of the (k_1)-st manipulated image for testing to the (k_n)-th manipulated image for testing in the k-th integrated test image by using the k-th feature map for testing, instructing the pooling layer to generate a k-th pooled feature map for testing by applying the pooling operations to one or more regions, corresponding to the (k_1)-st object proposals for testing to the (k_n)-th object proposals for testing, on the k-th feature map for testing, and instructing the FC layer to apply the fully connected operation to the k-th pooled feature map for testing, to thereby generate (k_1)-st object detection information for testing to (k_n)-th object detection information for testing, corresponding to the target object for testing, and (iv) instructing the target object merging network to generate k-th merged object proposals for testing by merging the (k_1)-st object proposals for testing to the (k_n)-th object proposals for testing, and generate k-th merged object detection information for testing by merging the (k_1)-st object detection information for testing to the (k_n)-th object detection information for testing, by increasing k from 2 to n.

As one example, at the process of (1), the learning device has instructed an RPN loss layer to calculate one or more first RPN losses by referring to information on the first merged object proposals and their corresponding GTs, to thereby adjust at least part of parameters of the RPN by backpropagating the first RPN losses, and, at the process of (2), the learning device has instructed the RPN loss layer to calculate one or more k-th RPN losses by referring to information on the k-th merged object proposals and their corresponding GTs, to thereby adjust at least part of the parameters of the RPN by backpropagating the k-th RPN losses.

As one example, at the step of (a), the testing device instructs the image-manipulating network to adjust at least one of widths and lengths of the (1_1)-st manipulated image for testing to the (1_n)-th manipulated image for testing to be identical, and concatenates the (1_1)-st adjusted manipulated image for testing to the (1_n)-th adjusted manipulated image for testing in a direction of the widths or the lengths which are adjusted to be identical, and, at the step of (b), the testing device instructs the image-manipulating network to adjust at least one of widths and lengths of the (k_1)-st manipulated image for testing to the (k_n)-th manipulated image for testing to be identical, and concatenates the (k_1)-st adjusted manipulated image for testing to the (k_n)-th adjusted manipulated image for testing in a direction of the widths or the lengths which are adjusted to be identical.

As one example, the testing device instructs the image-manipulating network to add at least one zero padding region in-between each pair comprised of two neighboring adjusted manipulated images for testing which are concatenated, among the (k_1)-st adjusted manipulated image for testing to the (k_n)-th adjusted manipulated image for testing, wherein the integrated test image is reduced by a ratio of 1/S by multiple convolution operations of the convolutional layers, and wherein, if a maximum size of each kernel of each of the convolutional layers is K×K, a distance in-between said each pair comprised of the two neighboring adjusted manipulated images for testing is determined as S×(K−1)/2.

As one example, supposing that at least one specific identical object for testing is located on each of a first specific manipulated image for testing and a second specific manipulated image for testing, and that at least one object proposal for testing, corresponding to the specific identical object for testing, on the first specific manipulated image for testing, is a first specific object proposal for testing, and that at least one object proposal for testing, corresponding to the specific identical object for testing, on the second specific manipulated image for testing, is a second specific object proposal for testing, the testing device instructs the target object merging network to determine whether an IOU for testing between the first specific object proposal for testing and the second specific object proposal for testing is equal to or greater than a first threshold, then (I) if the IOU for testing is determined as less than the first threshold, calculates an adjusted IOU for testing between an area, corresponding to the first specific object proposal for testing, on the second specific manipulated image for testing and an area, corresponding to the second specific object proposal for testing, on the first specific manipulated image for testing, and (II) if the adjusted IOU for testing is determined as equal to or greater than a second threshold, selects (i) one of a higher probability among the first specific object proposal for testing and the second specific object proposal for testing, or (ii) one of a larger area calculated on the test image among the first specific object proposal for testing and the second specific object proposal for testing, to thereby output the selected one as a specific merged object proposal for testing corresponding to the specific identical object for testing, wherein the IOU for testing is an intersection over union.

As one example, supposing that at least one specific identical object for testing is located on each of a first specific manipulated image for testing and a second specific manipulated image for testing, and that at least one object bounding box for testing, corresponding to the specific identical object for testing, on the first specific manipulated image for testing, is a first specific object bounding box for testing, and that at least one object bounding box for testing, corresponding to the specific identical object for testing, on the second specific manipulated image for testing, is a second specific object bounding box for testing, the testing device instructs the target object merging network to determine whether an IOU for testing between the first specific object bounding box for testing and the second specific object bounding box for testing is equal to or greater than a first threshold, then (I) if the IOU for testing is determined as less than the first threshold, calculates an adjusted IOU for testing between an area, corresponding to the first specific object bounding box for testing, on the second specific manipulated image for testing and an area, corresponding to the second specific object bounding box for testing, on the first specific manipulated image for testing, and (II) if the adjusted IOU for testing is determined as equal to or greater than a second threshold, selects (i) one of a higher probability among the first specific object bounding box for testing and the second specific object bounding box for testing, or (ii) one of a larger area calculated on the test image among the first specific object bounding box for testing and the second specific object bounding box for testing, to thereby output the selected one as a specific merged object detection information for testing corresponding to the specific identical object for testing, wherein the IOU for testing is an intersection over union.

As one example, at the step of (b), the testing device instructs the target object estimating network to (i) divide a specific manipulated image for testing into an M×N grid, (ii) generate at least one histogram map for testing representing the number of each of corresponding specific object proposals for testing, among the (k_1)-st object proposals for testing to the (k_n)-th object proposals for testing, per each cell of the grid, wherein each partial area or each whole area of said each of corresponding specific proposals for testing is present in its corresponding cell of the grid, and (iii) determine at least one specific target region for testing by using at least one region of a moving window for testing, wherein the at least one region has a largest value of summation of the histogram map for testing among all regions to be occupied by changing a location of the moving window for testing.

In accordance with still another aspect of the present disclosure, there is provided a learning device for learning parameters of an object detector based on a CNN by using a target object merging network and a target region estimating network, including: at least one memory that stores instructions; and at least one processor configured to execute the instructions to: perform processes of (I) (i) instructing an image-manipulating network to generate a (1_1)-st manipulated image to a (1_n)-th manipulated image corresponding to first estimated target regions, where each of at least one target objects is estimated as located, on each of a (1_1)-st image to a (1_n)-th image included in a first image pyramid corresponding to a first frame which is a current frame of at least one training video, and generate a first integrated training image by concatenating the (1_1)-st manipulated image to the (1_n)-th manipulated image, (ii) instructing one or more convolutional layers to apply one or more convolution operations to the first integrated training image, to thereby generate a first feature map, instructing an RPN to generate (1_1)-st object proposals to (1_n)-th object proposals, corresponding to the target object located on each of the (1_1)-st manipulated image to the (1_n)-th manipulated image in the first integrated training image by using the first feature map, instructing a pooling layer to generate a first pooled feature map by applying one or more pooling operations to one or more regions, corresponding to the (1_1)-st object proposals to the (1_n)-th object proposals, on the first feature map, and instructing an FC layer to apply at least one fully connected operation to the first pooled feature map, to thereby generate (1_1)-st object detection information to (1_n)-th object detection information, corresponding to the target object, and (iii) instructing the target object merging network to generate first merged object proposals by merging the (1_1)-st object proposals to the (1_n)-th object proposals, and generate first merged object detection information by merging the (1_1)-st object detection information to the (1_n)-th object detection information, and instructing an FC loss layer to calculate one or more first FC losses by referring to the first merged object detection information and its corresponding GT, to thereby learn at least part of parameters of the FC layer and the convolutional layers by backpropagating the first FC losses, and (II) (i) instructing the target object estimating network to search for (k−1)-th target regions, where the target object is estimated as located, on the (k−1)-th frame by referring to {(k−1)_1}-st object proposals to {(k−1)_n}-th object proposals on a (k−1)-th integrated training image, and instructing the target region estimating network to search for k-th estimated target regions, corresponding to one or more regions, where the (k−1)-th target regions are estimated as located, on a k-th frame, (ii) instructing the image-manipulating network to generate a (k_1)-st manipulated image to a (k_n)-th manipulated image corresponding to the k-th estimated target regions, on each of a (k_1)-st image to a (k_n)-th image included in a k-th image pyramid corresponding to the k-th frame, and generate a k-th integrated training image by concatenating the (k_1)-st manipulated image to the (k_n)-th manipulated image, (iii) instructing the convolutional layers to apply the convolution operations to the k-th integrated training image, to thereby generate a k-th feature map, instructing the RPN to generate (k_1)-st object proposals to (k_n)-th object proposals, corresponding to the target object located on each of the (k_1)-st manipulated image to the (k_n)-th manipulated image in the k-th integrated training image by using the k-th feature map, instructing the pooling layer to generate a k-th pooled feature map by applying the pooling operations to one or more regions, corresponding to the (k_1)-st object proposals to the (k_n)-th object proposals, on the k-th feature map, and instructing the FC layer to apply the fully connected operation to the k-th pooled feature map, to thereby generate (k_1)-st object detection information to (k_n)-th object detection information, corresponding to the target object, and (iv) instructing the target object merging network to generate k-th merged object proposals by merging the (k_1)-st object proposals to the (k_n)-th object proposals, and generate k-th merged object detection information by merging the (k_1)-st object detection information to the (k_n)-th object detection information, and instructing the FC loss layer to calculate one or more k-th FC losses by referring to the k-th merged object detection information and its corresponding GT, to thereby learn at least part of parameters of the FC layer and the convolutional layers by backpropagating the k-th FC losses, by increasing k from 2 to n.

As one example, at the process of (I), the processor instructs an RPN loss layer to calculate one or more first RPN losses by referring to information on the first merged object proposals and their corresponding GTs, to thereby adjust at least part of parameters of the RPN by backpropagating the first RPN losses, and, at the process of (II), the processor instructs the RPN loss layer to calculate one or more k-th RPN losses by referring to information on the k-th merged object proposals and their corresponding GTs, to thereby adjust at least part of the parameters of the RPN by backpropagating the k-th RPN losses.

As one example, at the process of (I), the processor instructs the image-manipulating network to adjust at least one of widths and lengths of the (1_1)-st manipulated image to the (1_n)-th manipulated image to be identical, and concatenates the (1_1)-st adjusted manipulated image to the (1_n)-th adjusted manipulated image in a direction of the widths or the lengths which are adjusted to be identical, and, at the process of (II), the processor instructs the image-manipulating network to adjust at least one of widths and lengths of the (k_1)-st manipulated image to the (k_n)-th manipulated image to be identical, and concatenates the (k_1)-st adjusted manipulated image to the (k_n)-th adjusted manipulated image in a direction of the widths or the lengths which are adjusted to be identical.

As one example, the processor instructs the image-manipulating network to add at least one zero padding region in-between each pair comprised of two neighboring adjusted manipulated images which are concatenated, among the (k_1)-st adjusted manipulated image to the (k_n)-th adjusted manipulated image, wherein the integrated training image is reduced by a ratio of 1/S by multiple convolution operations of the convolutional layers, and wherein, if a maximum size of each kernel of each of the convolutional layers is K×K, a distance in-between said each pair comprised of the two neighboring adjusted manipulated images is determined as S×(K−1)/2.

As one example, supposing that at least one specific identical object is located on each of a first specific manipulated image and a second specific manipulated image, and that at least one object proposal, corresponding to the specific identical object, on the first specific manipulated image, is a first specific object proposal, and that at least one object proposal, corresponding to the specific identical object, on the second specific manipulated image, is a second specific object proposal, the processor instructs the target object merging network to determine whether an IOU between the first specific object proposal and the second specific object proposal is equal to or greater than a first threshold, then (i) if the IOU is determined as less than the first threshold, calculates an adjusted IOU between an area, corresponding to the first specific object proposal, on the second specific manipulated image and an area, corresponding to the second specific object proposal, on the first specific manipulated image, and (ii) if the adjusted IOU is determined as equal to or greater than a second threshold, selects one of a higher probability among the first specific object proposal and the second specific object proposal, or one of a larger area calculated on the training image among the first specific object proposal and the second specific object proposal, to thereby output the selected one as a specific merged object proposal corresponding to the specific identical object, wherein the IOU is an intersection over union.

As one example, supposing that at least one specific identical object is located on each of a first specific manipulated image and a second specific manipulated image, and that at least one object bounding box, corresponding to the specific identical object, on the first specific manipulated image, is a first specific object bounding box, and that at least one object bounding box, corresponding to the specific identical object, on the second specific manipulated image, is a second specific object bounding box, the processor instructs the target object merging network to determine whether an IOU between the first specific object bounding box and the second specific object bounding box is equal to or greater than a first threshold, then (i) if the IOU is determined as less than the first threshold, calculates an adjusted IOU between an area, corresponding to the first specific object bounding box, on the second specific manipulated image and an area, corresponding to the second specific object bounding box, on the first specific manipulated image, and (ii) if the adjusted IOU is determined as equal to or greater than a second threshold, selects one of a higher probability among the first specific object bounding box and the second specific object bounding box, or one of a larger area calculated on the training image among the first specific object bounding box and the second specific object bounding box, to thereby output the selected one as a specific merged object detection information corresponding to the specific identical object, wherein the IOU is an intersection over union.

As one example, at the process of (II), the processor instructs the target object estimating network to (i) divide a specific manipulated image into an M×N grid, (ii) generate at least one histogram map representing the number of each of corresponding specific object proposals, among the (k_1)-st object proposals to the (k_n)-th object proposals, per each cell of the grid, wherein each partial area or each whole area of said each of corresponding specific proposals is present in its corresponding cell of the grid, and (iii) determine at least one specific target region by using at least one region of a moving window, wherein the at least one region has a largest value of summation of the histogram map among all regions to be occupied by changing a location of the moving window.

In accordance with still yet another aspect of the present disclosure, there is provided a testing device for testing an object detector based on a CNN by using a target object merging network and a target region estimating network, including: at least one memory that stores instructions; and at least one processor, on condition that a learning device has performed processes of (1) (i) instructing an image-manipulating network to generate a (1_1)-st manipulated image for training to a (1_n)-th manipulated image for training corresponding to first estimated target regions for training, where each of at least one target objects for training is estimated as located, on each of a (1_1)-st training image to a (1_n)-th training image included in a first image pyramid for training corresponding to a first frame for training which is a current frame of at least one training video, and generate a first integrated training image by concatenating the (1_1)-st manipulated image for training to the (1_n)-th manipulated image for training, (ii) instructing one or more convolutional layers to apply one or more convolution operations to the first integrated training image, to thereby generate a first feature map for training, instructing an RPN to generate (1_1)-st object proposals for training to (1_n)-th object proposals for training, corresponding to the target object for training located on each of the (1_1)-st manipulated image for training to the (1_n)-th manipulated image for training in the first integrated training image by using the first feature map for training, instructing a pooling layer to generate a first pooled feature map for training by applying one or more pooling operations to one or more regions, corresponding to the (1_1)-st object proposals for training to the (1_n)-th object proposals for training, on the first feature map for training, and instructing an FC layer to apply at least one fully connected operation to the first pooled feature map for training, to thereby generate (1_1)-st object detection information for training to (1_n)-th object detection information for training, corresponding to the target object for training, and (iii) instructing the target object merging network to generate first merged object proposals for training by merging the (1_1)-st object proposals for training to the (1_n)-th object proposals for training, and generate first merged object detection information for training by merging the (1_1)-st object detection information for training to the (1_n)-th object detection information for training, and instructing an FC loss layer to calculate one or more first FC losses by referring to the first merged object detection information for training and its corresponding GT, to thereby learn at least part of parameters of the FC layer and the convolutional layers by backpropagating the first FC losses, and (2) (i) instructing the target object estimating network to search for (k−1)-th target regions for training, where the target object for training is estimated as located, on the (k−1)-th frame for training by referring to {(k−1)_1}-st object proposals for training to {(k−1)_n}-th object proposals for training on a (k−1)-th integrated training image, and instructing the target region estimating network to search for k-th estimated target regions for training, corresponding to one or more regions, where the (k−1)-th target regions for training are estimated as located, on a k-th frame for training, (ii) instructing the image-manipulating network to generate a (k_1)-st manipulated image for training to a (k_n)-th manipulated image for training corresponding to the k-th estimated target regions for training, on each of a (k_1)-st training image to a (k_n)-th training image included in a k-th image pyramid for training corresponding to the k-th frame for training, and generate a k-th integrated training image by concatenating the (k_1)-st manipulated image for training to the (k_n)-th manipulated image for training, (iii) instructing the convolutional layers to apply the convolution operations to the k-th integrated training image, to thereby generate a k-th feature map for training, instructing the RPN to generate (k_1)-st object proposals for training to (k_n)-th object proposals for training, corresponding to the target object for training located on each of the (k_1)-st manipulated image for training to the (k_n)-th manipulated image for training in the k-th integrated training image by using the k-th feature map for training, instructing the pooling layer to generate a k-th pooled feature map for training by applying the pooling operations to one or more regions, corresponding to the (k_1)-st object proposals for training to the (k_n)-th object proposals for training, on the k-th feature map for training, and instructing the FC layer to apply the fully connected operation to the k-th pooled feature map for training, to thereby generate (k_1)-st object detection information for training to (k_n)-th object detection information for training, corresponding to the target object for training, and (iv) instructing the target object merging network to generate k-th merged object proposals for training by merging the (k_1)-st object proposals for training to the (k_n)-th object proposals for training, and generate k-th merged object detection information for training by merging the (k_1)-st object detection information for training to the (k_n)-th object detection information for training, and instructing the FC loss layer to calculate one or more k-th FC losses by referring to the k-th merged object detection information for training and its corresponding GT, to thereby learn at least part of parameters of the FC layer and the convolutional layers by backpropagating the k-th FC losses, by increasing k from 2 to n; configured to execute the instructions to: perform processes of (I) (i) instructing the image-manipulating network to generate a (1_1)-st manipulated image for testing to a (1_n)-th manipulated image for testing corresponding to first estimated target regions for testing, where each of at least one target objects for testing is estimated as located, on each of a (1_1)-st test image to a (1_n)-th test image included in a first image pyramid for testing corresponding to a first frame for testing which is a current frame of at least one test video, and generate a first integrated test image by concatenating the (1_1)-st manipulated image for testing to the (1_n)-th manipulated image for testing, (ii) instructing the convolutional layers to apply the convolution operations to the first integrated test image, to thereby generate a first feature map for testing, instructing the RPN to generate (1_1)-st object proposals for testing to (1_n)-th object proposals for testing, corresponding to the target object for testing located on each of the (1_1)-st manipulated image for testing to the (1_n)-th manipulated image for testing in the first integrated test image by using the first feature map for testing, instructing the pooling layer to generate a first pooled feature map for testing by applying the pooling operations to one or more regions, corresponding to the (1_1)-st object proposals for testing to the (1_n)-th object proposals for testing, on the first feature map for testing, and instructing the FC layer to apply the fully connected operation to the first pooled feature map for testing, to thereby generate (1_1)-st object detection information for testing to (1_n)-th object detection information for testing, corresponding to the target object for testing, and (iii) instructing the target object merging network to generate first merged object proposals for testing by merging the (1_1)-st object proposals for testing to the (1_n)-th object proposals for testing, and generate first merged object detection information for testing by merging the (1_1)-st object detection information for testing to the (1_n)-th object detection information for testing, and (II) (i) instructing the target object estimating network to search for (k−1)-th target regions for testing, where the target object for testing is estimated as located, on the (k−1)-th frame for testing by referring to {(k−1)_1}-st object proposals for testing to {(k−1)_n}-th object proposals for testing on a (k−1)-th integrated test image, and instructing the target region estimating network to search for k-th estimated target regions for testing, corresponding to one or more regions, where the (k−1)-th target regions for testing are estimated as located, on a k-th frame for testing, (ii) instructing the image-manipulating network to generate a (k_1)-st manipulated image for testing to a (k_n)-th manipulated image for testing corresponding to the k-th estimated target regions for testing, on each of a (k_1)-st test image to a (k_n)-th test image included in a k-th image pyramid for testing corresponding to the k-th frame for testing, and generate a k-th integrated test image by concatenating the (k_1)-st manipulated image for testing to the (k_n)-th manipulated image for testing, (iii) instructing the convolutional layers to apply the convolution operations to the k-th integrated test image, to thereby generate a k-th feature map for testing, instructing the RPN to generate (k_1)-st object proposals for testing to (k_n)-th object proposals for testing, corresponding to the target object for testing located on each of the (k_1)-st manipulated image for testing to the (k_n)-th manipulated image for testing in the k-th integrated test image by using the k-th feature map for testing, instructing the pooling layer to generate a k-th pooled feature map for testing by applying the pooling operations to one or more regions, corresponding to the (k_1)-st object proposals for testing to the (k_n)-th object proposals for testing, on the k-th feature map for testing, and instructing the FC layer to apply the fully connected operation to the k-th pooled feature map for testing, to thereby generate (k_1)-st object detection information for testing to (k_n)-th object detection information for testing, corresponding to the target object for testing, and (iv) instructing the target object merging network to generate k-th merged object proposals for testing by merging the (k_1)-st object proposals for testing to the (k_n)-th object proposals for testing, and generate k-th merged object detection information for testing by merging the (k_1)-st object detection information for testing to the (k_n)-th object detection information for testing, by increasing k from 2 to n.

As one example, at the process of (1), the learning device has instructed an RPN loss layer to calculate one or more first RPN losses by referring to information on the first merged object proposals and their corresponding GTs, to thereby adjust at least part of parameters of the RPN by backpropagating the first RPN losses, and, at the process of (2), the learning device has instructed the RPN loss layer to calculate one or more k-th RPN losses by referring to information on the k-th merged object proposals and their corresponding GTs, to thereby adjust at least part of the parameters of the RPN by backpropagating the k-th RPN losses.

As one example, at the process of (I), the processor instructs the image-manipulating network to adjust at least one of widths and lengths of the (1_1)-st manipulated image for testing to the (1_n)-th manipulated image for testing to be identical, and concatenates the (1_1)-st adjusted manipulated image for testing to the (1_n)-th adjusted manipulated image for testing in a direction of the widths or the lengths which are adjusted to be identical, and, at the process of (II), the processor instructs the image-manipulating network to adjust at least one of widths and lengths of the (k_1)-st manipulated image for testing to the (kn)-th manipulated image for testing to be identical, and concatenates the (k_1)-st adjusted manipulated image for testing to the (k_n)-th adjusted manipulated image for testing in a direction of the widths or the lengths which are adjusted to be identical.

As one example, the processor instructs the image-manipulating network to add at least one zero padding region in-between each pair comprised of two neighboring adjusted manipulated images for testing which are concatenated, among the (k_1)-st adjusted manipulated image for testing to the (k_n)-th adjusted manipulated image for testing, wherein the integrated test image is reduced by a ratio of 1/S by multiple convolution operations of the convolutional layers, and wherein, if a maximum size of each kernel of each of the convolutional layers is KxK, a distance in-between said each pair comprised of the two neighboring adjusted manipulated images for testing is determined as S×(K−1)/2.

As one example, supposing that at least one specific identical object for testing is located on each of a first specific manipulated image for testing and a second specific manipulated image for testing, and that at least one object proposal for testing, corresponding to the specific identical object for testing, on the first specific manipulated image for testing, is a first specific object proposal for testing, and that at least one object proposal for testing, corresponding to the specific identical object for testing, on the second specific manipulated image for testing, is a second specific object proposal for testing, the processor instructs the target object merging network to determine whether an IOU for testing between the first specific object proposal for testing and the second specific object proposal for testing is equal to or greater than a first threshold, then (i) if the IOU for testing is determined as less than the first threshold, calculates an adjusted IOU for testing between an area, corresponding to the first specific object proposal for testing, on the second specific manipulated image for testing and an area, corresponding to the second specific object proposal for testing, on the first specific manipulated image for testing, and (ii) if the adjusted IOU for testing is determined as equal to or greater than a second threshold, selects one of a higher probability among the first specific object proposal for testing and the second specific object proposal for testing, or one of a larger area calculated on the test image among the first specific object proposal for testing and the second specific object proposal for testing, to thereby output the selected one as a specific merged object proposal for testing corresponding to the specific identical object for testing, wherein the IOU for testing is an intersection over union.

As one example, supposing that at least one specific identical object for testing is located on each of a first specific manipulated image for testing and a second specific manipulated image for testing, and that at least one object bounding box for testing, corresponding to the specific identical object for testing, on the first specific manipulated image for testing, is a first specific object bounding box for testing, and that at least one object bounding box for testing, corresponding to the specific identical object for testing, on the second specific manipulated image for testing, is a second specific object bounding box for testing, the processor instructs the target object merging network to determine whether an IOU for testing between the first specific object bounding box for testing and the second specific object bounding box for testing is equal to or greater than a first threshold, then (i) if the IOU for testing is determined as less than the first threshold, calculates an adjusted IOU for testing between an area, corresponding to the first specific object bounding box for testing, on the second specific manipulated image for testing and an area, corresponding to the second specific object bounding box for testing, on the first specific manipulated image for testing, and (ii) if the adjusted IOU for testing is determined as equal to or greater than a second threshold, selects one of a higher probability among the first specific object bounding box for testing and the second specific object bounding box for testing, or one of a larger area calculated on the test image among the first specific object bounding box for testing and the second specific object bounding box for testing, to thereby output the selected one as a specific merged object detection information for testing corresponding to the specific identical object for testing, wherein the IOU for testing is an intersection over union.

As one example, at the process of (II), the processor instructs the target object estimating network to (i) divide a specific manipulated image for testing into an M×N grid, (ii) generate at least one histogram map for testing representing the number of each of corresponding specific object proposals for testing, among the (k_1)-st object proposals for testing to the (k_n)-th object proposals for testing, per each cell of the grid, wherein each partial area or each whole area of said each of corresponding specific proposals for testing is present in its corresponding cell of the grid, and (iii) determine at least one specific target region for testing by using at least one region of a moving window for testing, wherein the at least one region has a largest value of summation of the histogram map for testing among all regions to be occupied by changing a location of the moving window for testing.

In addition, recordable media that are readable by a computer for storing a computer program to execute the method of the present disclosure is further provided.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

Figure 1:
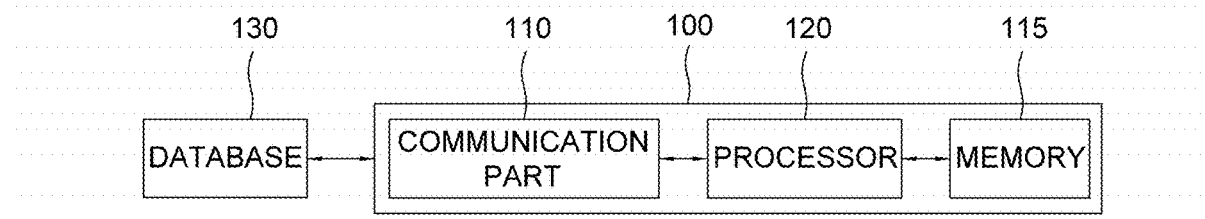

FIG. 1 is a drawing schematically illustrating a learning device for learning an object detector based on a CNN using a target object merging network and a target region estimating network in accordance with one example embodiment of the present disclosure.

Figure 2:
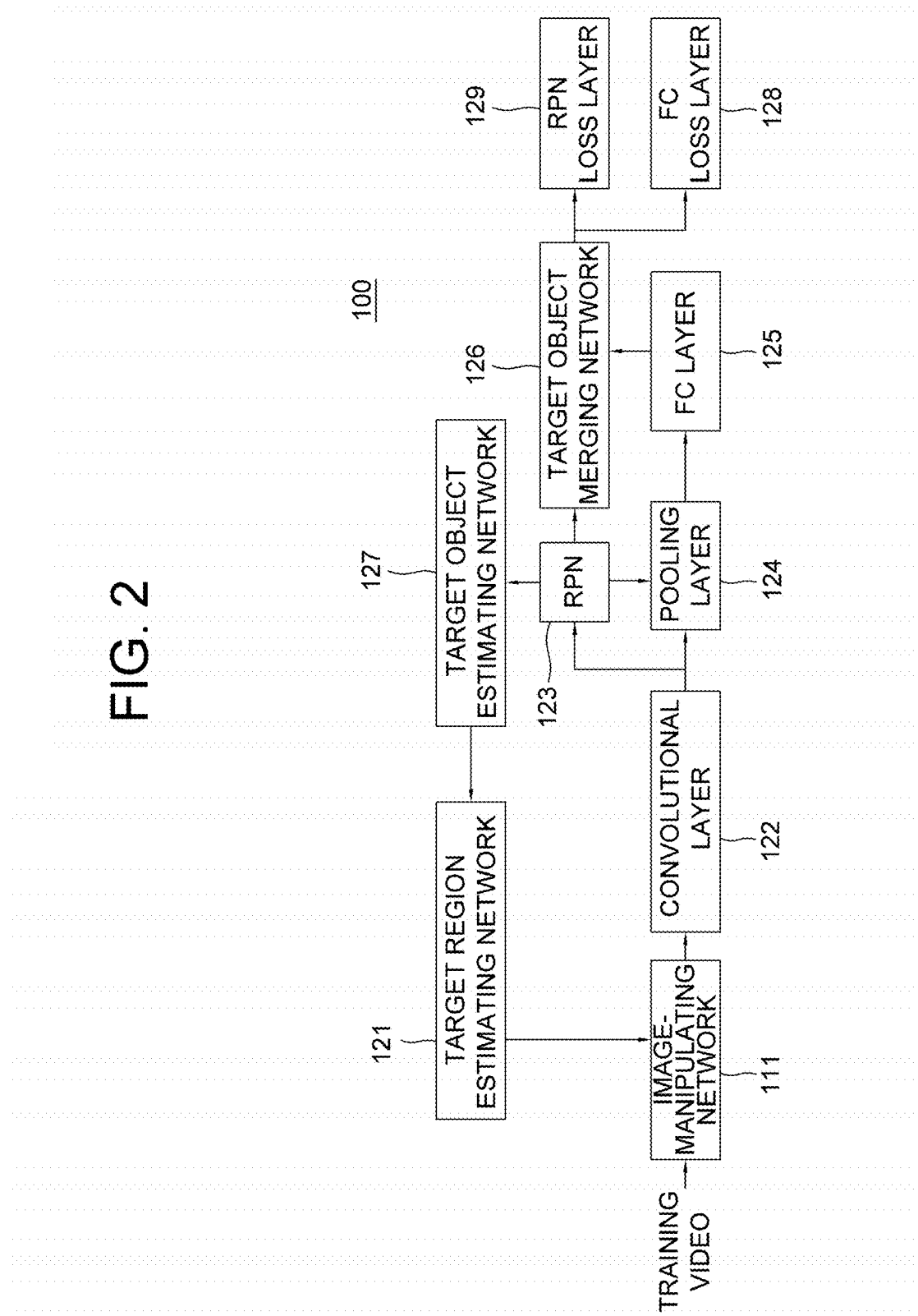

FIG. 2 is a drawing schematically illustrating a learning method for learning the object detector based on the CNN using the target object merging network and the target region estimating network in accordance with one example embodiment of the present disclosure.

Figure 3:
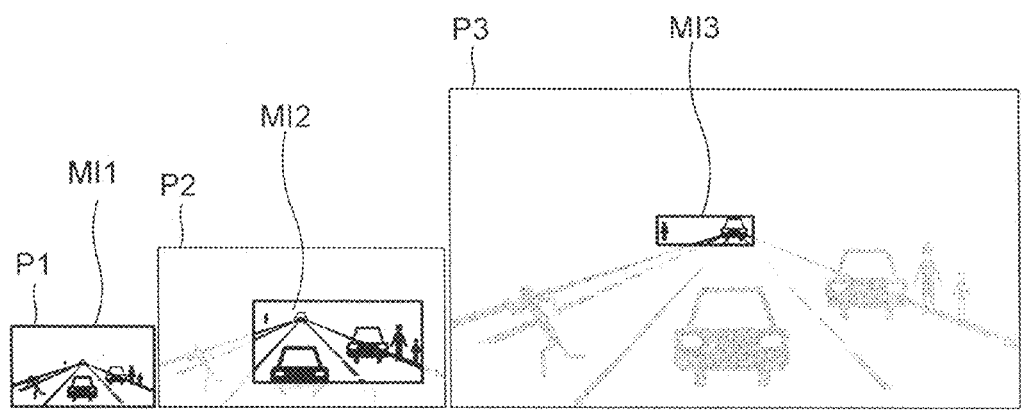

FIG. 3 is a drawing schematically illustrating a process of estimating each of target regions on images included in an image pyramid, to be used for learning the object detector based on the CNN using the target object merging network and the target region estimating network in accordance with one example embodiment of the present disclosure.

Figure 4:
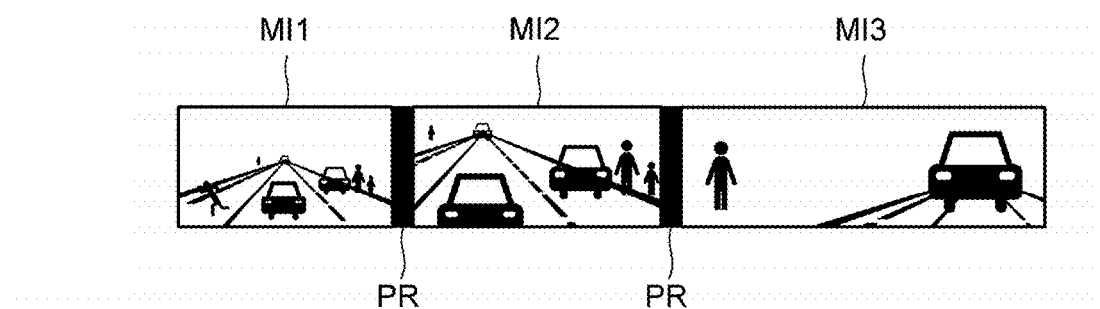

FIG. 4 is a drawing schematically illustrating a concatenation of manipulated images corresponding to each of the target regions to be used for learning the object detector based on the CNN using the target object merging network and the target region estimating network in accordance with one example embodiment of the present disclosure.

Figure 5:
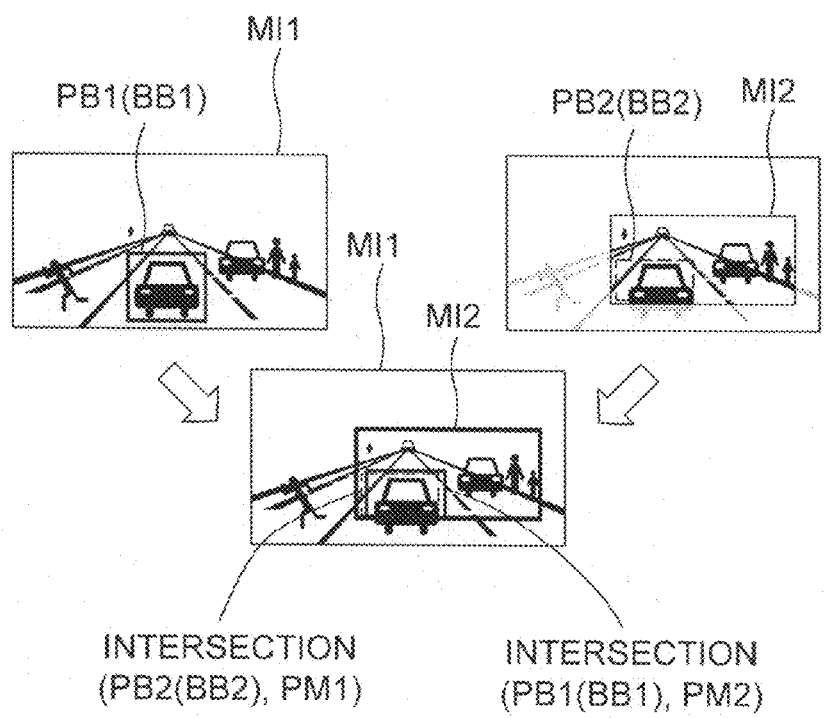

FIG. 5 is a drawing schematically illustrating a process of merging one or more target objects to be considered for the learning method for learning the object detector based on the CNN using the target object merging network and the target region estimating network in accordance with one example embodiment of the present disclosure.

Figure 6:
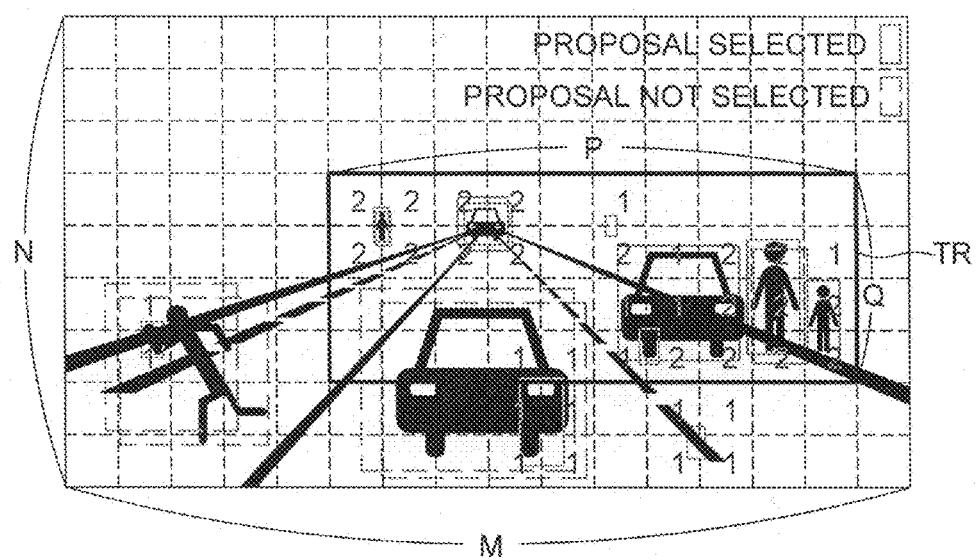

FIG. 6 is a drawing schematically illustrating a process of searching for target regions, by using object proposals outputted from an RPN, to be considered for the learning method for the object detector based on the CNN using the target object merging network and the target region estimating network in accordance with one example embodiment of the present disclosure.

Figure 7:
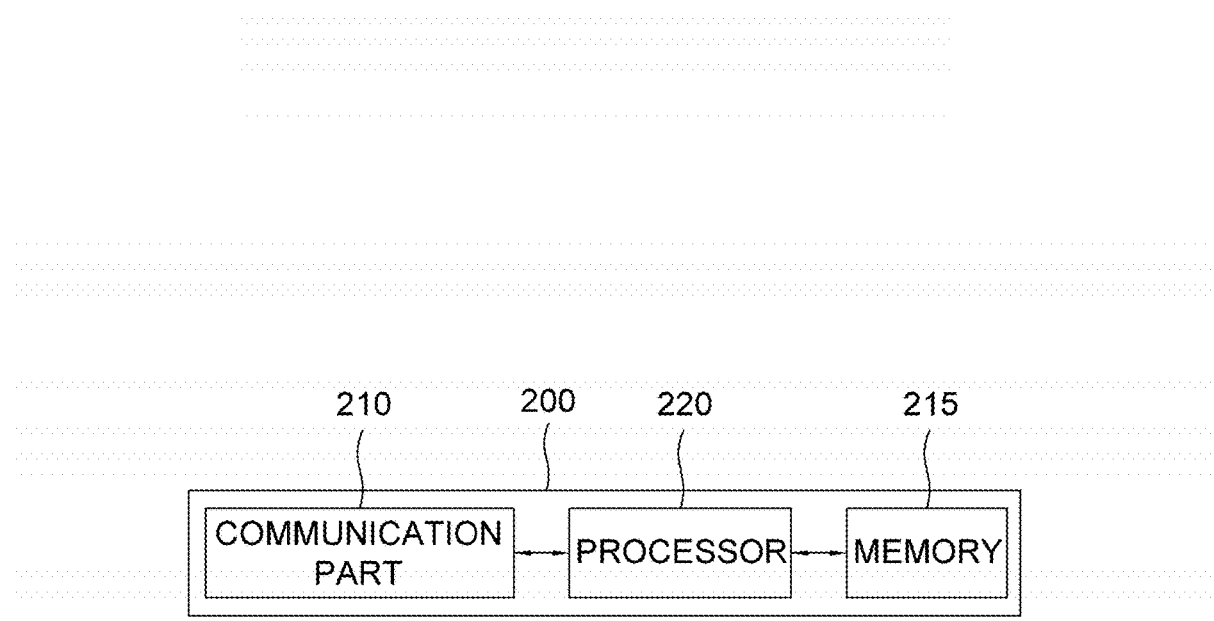

FIG. 7 is a drawing schematically illustrating a testing device for learning the object detector based on the CNN using the target object merging network and the target region estimating network in accordance with one example embodiment of the present disclosure.

Figure 8:
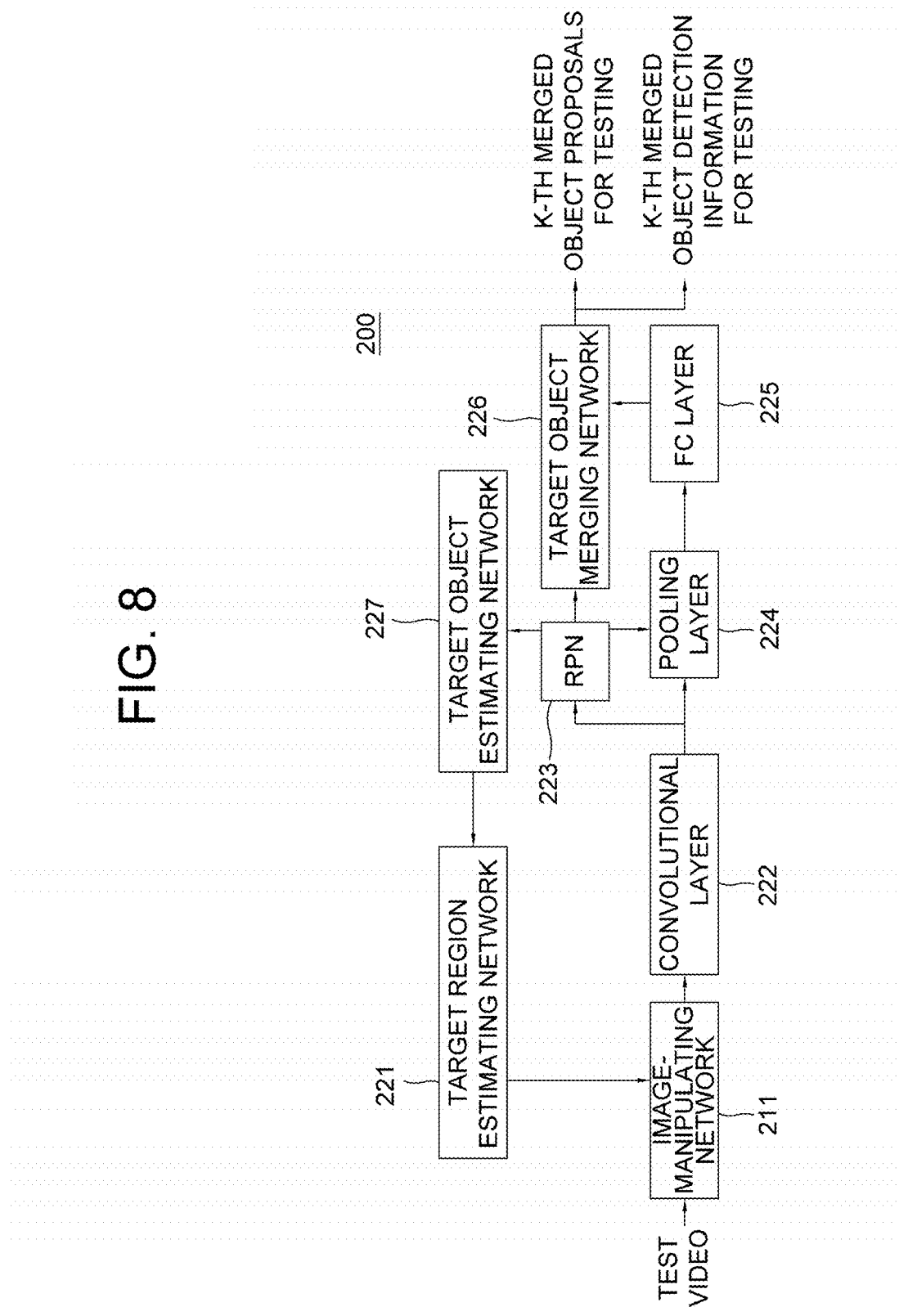

FIG. 8 is a drawing schematically illustrating a testing method for learning the object detector based on the CNN using the target object merging network and the target region estimating network in accordance with one example embodiment of the present disclosure.

DETAILED DESCRIPTION OF THE PREFERRED EMBODIMENTS

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached diagrams will be explained in detail as shown below.

FIG. 1 is a drawing schematically illustrating a learning device for learning an object detector based on a CNN using a target object estimating network and a target region estimating network in accordance with one example embodiment of the present disclosure. By referring to FIG. 1, the learning device 100 may include a communication part 110 and a processor 120.

First, the communication part 110 may acquire or support another device to acquire at least one training video.

Herein, the training video may be stored in a database 130, and the database 130 may store at least one ground truth, i.e., GT, of class information on each of one or more objects in each of frames in the training video and location information on each of the objects in each of frames in the training video. Also, the database 130 may store at least one ground truth of class information on each of the objects and location information on each of the objects located in resized images which are generated by resizing each of the frames in the training video.

In addition, the learning device may further include a memory 115 capable of storing computer readable instructions for performing following processes. As one example, the processor, the memory, a medium, etc. may be integrated with an integrated processor.

Next, the processor 120 may perform processes of (i) instructing an image-manipulating network to generate a (1_1)-st manipulated image to a (1_n)-th manipulated image corresponding to first estimated target regions, where at least one target object is estimated as located, on each of a (1_1)-st image to a (1_n)-th image included in a first image pyramid corresponding to a first frame which is a current frame of the training video, and generate a first integrated training image by concatenating the (1_1)-st manipulated image to the (1_n)-th manipulated image, (ii) instructing one or more convolutional layers to apply one or more convolution operations to the first integrated training image, to thereby generate a first feature map, instructing an RPN to generate (1_1)-st object proposals to (1_n)-th object proposals, corresponding to the target object located on each of the (1_1)-st manipulated image to the (1_n)-th manipulated image in the first integrated training image by using the first feature map, instructing a pooling layer to generate a first pooled feature map by applying one or more pooling operations to one or more regions, corresponding to the (1_1)-st object proposals to the (1_n)-th object proposals, on the first feature map, and instructing an FC layer to apply at least one fully connected operation to the first pooled feature map, to thereby generate (1_1)-st object detection information to (1_n)-th object detection information, corresponding to the target object, and (iii) instructing the target object merging network to generate first merged object proposals by merging the (1_1)-st object proposals to the (1_n)-th object proposals, and generate first merged object detection information by merging the (1_1)-st object detection information to the (1_n)-th object detection information, and instructing an FC loss layer to calculate one or more first FC losses by referring to the first merged object detection information and its corresponding GT, to thereby learn at least part of parameters of the FC layer and the convolutional layers by backpropagating the first FC losses. Then, the processor 120 may perform processes of (i) instructing the target object estimating network to search for (k−1)-th target regions where the target object is estimated as located on the (k−1)-th frame by referring to {(k−1)_1}-st object proposals to {(k−1)_n}-th object proposals on a (k−1)-th integrated training image, and instructing the target region estimating network to search for k-th estimated target regions corresponding to one or more regions where the (k−1)-th target regions are estimated as located on a k-th frame, (ii) instructing the image-manipulating network to generate a (k_1)-st manipulated image to a (k_n)-th manipulated image corresponding to the k-th estimated target regions, on each of a (k_1)-st image to a (k_n)-th image included in a k-th image pyramid corresponding to the k-th frame, and generate a k-th integrated training image by concatenating the (k_1)-st manipulated image to the (k_n)-th manipulated image, (iii) instructing the convolutional layers to apply the convolution operations to the k-th integrated training image, to thereby generate a k-th feature map, instructing the RPN to generate (k_1)-st object proposals to (k_n)-th object proposals, corresponding to the target object located on each of the (k_1)-st manipulated image to the (k_n)-th manipulated image in the k-th integrated training image by using the k-th feature map, instructing the pooling layer to generate a k-th pooled feature map by applying the pooling operations to one or more regions, corresponding to the (k_1)-st object proposals to the (k_n)-th object proposals, on the k-th feature map, and instructing the FC layer to apply the fully connected operation to the k-th pooled feature map, to thereby generate (k_1)-st object detection information to (k_n)-th object detection information, corresponding to the target object, and (iv) instructing the target object merging network to generate k-th merged object proposals by merging the (k_1)-st object proposals to the (k_n)-th object proposals, and generate k-th merged object detection information by merging the (k_1)-st object detection information to the (k_n)-th object detection information, and instructing the FC loss layer to calculate one or more k-th FC losses by referring to the k-th merged object detection information and its corresponding GT, to thereby learn at least part of parameters of the FC layer and the convolutional layers by backpropagating the k-th FC losses, by increasing k from 2 to n.

Also, the processor 120 may instruct an RPN loss layer to calculate one or more first RPN losses by referring to information on the first merged object proposals and their corresponding GTs, to thereby adjust at least part of parameters of the RPN by backpropagating the first RPN losses, and may instruct the RPN loss layer to calculate one or more k-th RPN losses by referring to information on the k-th merged object proposals and their corresponding GTs, to thereby adjust at least part of the parameters of the RPN by backpropagating the k-th RPN losses.

Herein, the learning device 100 in accordance with one example of the present disclosure may be a computing device and may be any digital device with a processor capable of computation. For reference, although FIG. 1 shows the single learning device 100, the scope of the present disclosure is not limited thereto. For example, the learning device may be configured as several devices to perform its functions.

A method for learning parameters of the object detector based on the CNN using the target object merging network and the target region estimating network by using the learning device 100 in accordance with one example embodiment of the present disclosure is described by referring to FIG. 2 as follows.

First, if the training video is acquired, the learning device 100 may instruct an image-manipulating network 111 to generate the (1_1)-st manipulated image to the (1_n)-th manipulated image, corresponding to the first estimated target regions, where the target object is estimated as located, on each of the (1_1)-st image to the (1_n)-th image included in the first image pyramid corresponding to a first frame which is a current frame in the training video.

Herein, the first estimated target regions may be set by a target region estimating network 121. Also, the target region estimating network 121 may calculate each scale histogram for each of the (1_1)-st image to the (1_n)-th image and search for the first estimated target regions corresponding to scale proposals where the corresponding target objects are estimated as located, by referring to the calculated scale histogram. Then, the target region estimating network 121 may perform segmentation on each of the (1_1)-st image to the (1_n)-th image, may set seeds to search for the target regions based on the segmentation, and may set the first estimated target regions by referring to integrated regions into which small target regions are repeatedly integrated. Additionally, the target region estimating network 121 may identify foregrounds on each of the (1_1)-st image to the (1_n)-th image by a foreground segmentation and may set at least one area, where at least one target object is estimated as located and whose size is estimated as including the at least one target object, as the first estimated target regions by referring to the identified foregrounds. Further, the target region estimating network 121 may use a saliency detection method for setting the first estimated target regions. However, the scope of the present disclosure is not limited thereto, and any method of searching for the target regions where the target object is estimated as located on the image may be utilized.

As one example, by referring to FIG. 3, the (1_1)-st image P1 including the (1_1)-st estimated target region among the first estimated target regions may be considered as the (1_1)-st manipulated image MI1. The (1_2)-nd manipulated image MI2, corresponding to the (1_2)-nd estimated target region among the first estimated target regions, on the (1_2)-nd image P2, may be generated, and the (1_3)-rd manipulated image MI3, corresponding to the (1_3)-rd estimated target region among the first estimated target regions, on the (1_3)-rd image P3, may be generated.

Then, the learning device 100 may instruct the image-manipulating network 111 to generate a first integrated training image by concatenating the (1_1)-st manipulated image to the (1_3)-rd manipulated image.

Herein, the learning device 100 may instruct the image-manipulating network 111 to adjust at least one of widths and lengths of the (1_1)-st manipulated image to the (1_3)-rd manipulated image to be identical, and concatenate the (1_1)-st adjusted manipulated image to the (1_3)-rd adjusted manipulated image in a direction of the widths or the lengths which are adjusted to be identical.

Then, the learning device 100 may instruct the image-manipulating network 111 to add at least one zero padding region in-between each pair comprised of two neighboring adjusted manipulated images which are concatenated, among the first adjusted manipulated image to the (1_3)-rd adjusted manipulated image. Herein, the first integrated training image may be reduced by a ratio of 1/S by multiple convolution operations of the convolutional layers, and if a maximum size of each kernel of each of the convolutional layers is KxK, a distance in-between said each pair comprised of the two neighboring adjusted manipulated images may be determined as $S \times eK-1)/2$. As a result, an overhead to the CNN may be minimized.

As one example, by referring to FIG. 4, a height of the (1_1)-st manipulated image MI1, that of the (1_2)-nd manipulated image MI2, and that of the (1_3)-rd manipulated image MI3 generated by processes shown in FIG. 3 may be adjusted to be identical to each other and these manipulated images may be concatenated. Herein, each zero padding region PR may be added between each of the neighboring manipulated images. As another example, widths of the manipulated images may be adjusted to be identical and then each of the manipulated images may be concatenated by using the adjusted widths, or the widths and the heights are adjusted to be identical and then each of the manipulated images may be concatenated into a large squared shape.

Next, the learning device 100 may instruct a convolutional layer 122 to apply the convolution operations to the first integrated training image, to thereby generate at least one first integrated feature map. Herein, the convolutional layer 122 may be a single convolutional layer or multiple convolutional layers.

Then, the learning device 100 may instruct an RPN 123 to generate one or more (1_1)-st object proposals to one or more (1_n)-th object proposals corresponding to the target objects in the (1_1)-st manipulated image to the (1_n)-th manipulated image included in the first integrated training image by using the first integrated feature map.

Herein, each of the (1_1)-st object proposals to the (1_n)-th object proposals may correspond to each of the target objects in the (1_1)-st manipulated image to the (1_n)-th manipulated image, and each of the object proposals may include information on each proposal box having location information corresponding to each of the target objects, i.e., a tagged area and information on whether it is an object. Herein, the information on whether it is an object may include probability information by which said each object proposal is estimated as an object, and information on the proposal box may include probability information by which the proposal box is estimated as matching the location of the object.

Then, the learning device 100 may instruct a pooling layer 124 to apply the pooling operations to each region, corresponding to each of the (1_1)-st object proposals to the (1_n)-th object proposals, on the first integrated feature map, to thereby generate at least one first pooled integrated feature map, and may instruct an FC layer 125 to apply the fully connected operation to the first pooled integrated feature map, to thereby generate (1_1)-st object detection information to (1_n)-th object detection information corresponding to the target objects.

Herein, the (1_1)-st object detection information to the (1_n)-th object detection information may include class information on each of the target objects corresponding to the (1_1)-st object proposals to the (1_n)-th object proposals and information on bounding boxes, i.e., location information on each of the target objects. Also, the class information may include probability information by which each of the target objects is estimated as each class, and the information on the bounding boxes may include probability information by which each of the bounding boxes is estimated as matching the location of each of the target objects.

Then the learning device 100 may perform processes of (i) instructing a target object merging network 126 to generate first merged object proposals by merging the (1_1)-st object proposals to the (1_n)-th object proposals, and generate first merged object detection information by merging the (1_1)-st object detection information to the (1_n)-th object detection information. Herein, information on the (1_1)-st object proposals to the (1_n)-th object proposals may be converted to be corresponding to the first frame which is the current frame in the training video.

As one example, by referring to FIG. 5, supposing that at least one specific identical object is located on the (1_1)-st manipulated image MI1 and the (1_2)-nd manipulated image MI2, and that at least one object proposal, corresponding to the specific identical object, among the (1_1)-st object proposals on the (1_1)-st manipulated image MI1, is a (1_1)-st specific object proposal PB1, and that at least one object proposal, corresponding to the specific identical object, among the (1_2)-nd object proposals on the (1_2)-nd manipulated image MI2, is a (1_2)-nd specific object proposal PB2, the learning device 100 may instruct the target object merging network 126 to determine whether an IOU between the (1_1)-st specific object proposal PB1 and the (1_2)-nd specific object proposal PB2 is equal to or greater than a first threshold. Herein, the IOU is an intersection over union. Then, if the IOU is determined as less than the first threshold, an adjusted IOU between the (1_1)-st specific object proposal PB1 and the (1_2)-nd specific object proposal PB2 may be calculated.

Herein, the adjusted IOU may be an IOU calculated by referring to intersection(PB1, MI2), i.e., an area, corresponding to the (1_1)-st specific object proposal PB1, on the (1_2)-nd manipulated image MI2, and intersection(PB2, MI1), i.e., an area, corresponding to the (1_2)-nd specific object proposal PB2, on the (1_1)-st manipulated image MI1.

And if the adjusted IOU is determined as equal to or greater than a second threshold, the learning device 100 may select (i) one of a higher probability among the (1_1)-st specific object proposal PB1 and the (1_2)-nd specific object proposal PB2, or (ii) one of a larger area calculated on the first frame which is the current frame of the training video among the (1_1)-st specific object proposal PB1 and the (1_2)-nd specific object proposal PB2, to thereby output the selected one as a specific merged object proposal corresponding to the specific identical object.

However, if the adjusted IOU is determined as less than the second threshold, the learning device 100 may determine that the (1_1)-st specific object proposal PB1 and the (1_2)-nd specific object proposal PB2 respectively correspond to different objects. That is, if the IOU between the (1_1)-st specific object proposal PB1 and the (1_2)-nd specific object proposal PB2 is determined as less than the first threshold and the adjusted IOU between those two is determined as less than the second threshold, the learning device 100 may determine that the (1_1)-st specific object proposal PB1 and the (1_2)-nd specific object proposal PB2 respectively correspond to different objects.

In the meantime, if the IOU between the (1_1)-st specific object proposal PB1 and the (1_2)-nd specific object proposal PB2 is determined as equal to or greater than the first threshold, the learning device may select (i) one of a higher probability among the (1_1)-st specific object proposal PB1 and the (1_2)-nd specific object proposal PB2, or (ii) one of a larger area calculated on each of the manipulated images MI1 and MI2 among the (1_1)-st specific object proposal PB1 and the (1_2)-nd specific object proposal PB2, to thereby output the selected one as the specific merged object proposal corresponding to the specific identical object.

Also, by referring to FIG. 5, supposing that at least one specific identical object is located on the (1_1)-st manipulated image MI1 and the (1_2)-nd manipulated image MI2, and that at least one object bounding box, corresponding to the specific identical object, among object bounding boxes included in the (1_1)-st object detection information on the (1_1)-st manipulated image MI1, is a (1_1)-st specific object bounding box BB1, and that at least one object bounding box, corresponding to the specific identical object, among object bounding boxes included in the (1_2)-nd object detection information on the (1_2)-nd manipulated image MI2, is a (1_2)-nd specific object bounding box BB2, the learning device 100 may instruct the target object merging network 126 to determine whether the IOU between the (1_1)-st specific object bounding box BB1 and the (1_2)-nd specific object bounding box BB2 is equal to or greater than the first threshold. Herein, the first threshold used for the IOU between the object proposals and the first threshold used for the IOU between the object bounding boxes may be the same or different. Then, if the IOU between these two bounding boxes is determined as less than the first threshold, an adjusted IOU between the (1_1)-st specific object bounding box BB1 and the (1_2)-nd specific object bounding box BB2 may be calculated.

Herein, the adjusted IOU may be an IOU calculated by referring to intersection(BB1, MI2), i.e., an area, corresponding to the (1_1)-st specific object bounding box BB1, on the (1_2)-nd manipulated image MI2, and intersection (BB2, MI1), i.e., an area, corresponding to the (1_2)-nd specific object bounding box BB2, on the (1_1)-st manipulated image MI1.

And if the adjusted IOU is determined as equal to or greater than the second threshold, the learning device 100 may select (i) one of a higher probability among the (1_1)-st specific object bounding box BB1 and the (1_2)-nd specific object bounding box BB2, or (ii) one of a larger area calculated on the first frame which is the current frame in the training video among the (1_1)-st specific object bounding box BB1 and the (1_2)-nd specific object bounding box BB2, to thereby output the selected one as a specific merged object detection information corresponding to the specific identical object. Herein, the second threshold used for the IOU between the object proposals and the second threshold used for the IOU between the object bounding boxes may be the same or may be different.

However, if the adjusted IOU is determined as less than the second threshold, the learning device 100 may determine that the (1_1)-st specific object bounding box BB1 and the (1_2)-nd specific object bounding box BB2 respectively correspond to different objects. That is, if the IOU between the (1_1)-st specific object bounding box BB1 and the (1_2)-nd specific object bounding box BB2 is determined as less than the first threshold and the adjusted IOU between those two is determined as less than the second threshold, the learning device 100 may determine that the (1_1)-st specific object bounding box BB1 and the (1_2)-nd specific object bounding box BB2 respectively correspond to different objects.

In the meantime, if the IOU between the (1_1)-st specific object bounding box BB1 and the (1_2)-nd specific object bounding box BB2 is determined as equal to or greater than the first threshold, the learning device may select (i) one of a higher probability among the (1_1)-st specific object bounding box BB1 and the (1_2)-nd specific object bounding box BB2, or (ii) one of a larger area calculated on each of the manipulated images MI1 and MI2 among the (1_1)-st specific object bounding box BB1 and the (1_2)-nd specific object bounding box BB2, to thereby output the selected one as the specific merged object detection information corresponding to the specific identical object.

Then, the learning device 100 may instruct at least one FC loss layer 128 to generate one or more first FC losses by referring to the first merged object detection information and its corresponding GT, to thereby adjust at least part of parameters of the FC layer 125 and the convolutional layer 122 by backpropagating the first FC losses.

Also, the learning device 100 may instruct at least one RPN loss layer 129 to generate one or more first RPN losses by referring to the first merged object proposals and their corresponding GTs, to thereby adjust at least part of parameters of the RPN 123 by backpropagating the first RPN losses.

Then, the learning device 100 may instruct a target object estimating network 127 to search for first target regions, corresponding to an area, where the target object is estimated as located, on the (1_1)-st manipulated image to the (1_n)-th manipulated image, by referring to the (1_1)-st object proposals to the (1_n)-th object proposals on the (1_1)-st manipulated image to the (1_n)-th manipulated image.

As one example, by referring to FIG. 6, the target object estimating network 127 may (i) divide a specific manipulated image into an M×N grid, (ii) generate at least one histogram representing the number of each corresponding proposals, among the (1_1)-st object proposals to the (1_n)-th object proposals, per each cell of the grid, wherein each partial area or each whole area of said each corresponding proposals is present in its corresponding cell of the grid, where, preferably, the sizes of said each corresponding proposals, among the object proposals outputted from the RPN 123, are smaller than a predetermined size corresponding to a size of the target object and (iii) determine the target region TR by using at least one region of a moving window with a size of P×Q corresponding to a size of the target region, where the at least one region has a largest value of summation of the histogram among all regions to be occupied by changing a location of the moving window.

Then, the learning device 100 may instruct the target region estimating network 121 to search for a second estimated target regions, corresponding to at least one region, where the first target region is estimated as located, on a second frame which is a next frame following the first frame of the training video.

Thereafter, the learning device 100 may instruct the image-manipulating network 111 to generate a (2_1)-st manipulated image to a (2_n)-th manipulated image, corresponding to second estimated target regions, on each of a (2_1)-st image to a (2_n)-th image included in a second image pyramid corresponding to the second frame, and generate a second integrated training image by concatenating the (2_1)-st manipulated image to the (2_n)-th manipulated image, then repeat these processes to efficiently detect the target object on the training video.

In detail, the learning device 100 may perform or support another device to perform processes of (i) instructing the target object estimating network 127 to search for (k−1)-th target regions, where the target object is estimated as located, on a (k−1)-th frame, by referring to {(k−1)_1}-st object proposals to {(k−1)_n}-th object proposals on a (k−1)-th integrated training image, and (ii) instructing the target region estimating network 121 to search for k-th estimated target regions, corresponding to at least one region, where the (k−1)-th target regions are estimated as located, on the k-th frame, by increasing k from 2 to n. Then, the learning device 100 may instruct the image-manipulating network 121 to generate a (k_1)-st manipulated image to a (k_n)-th manipulated image, corresponding to k-th estimated target regions, on each of a (k_1)-st image to a (k_n)-th image included in a k-th image pyramid corresponding to a k-th frame, and generate a k-th integrated training image by concatenating the (k_1)-st manipulated image to the (k_n)-th manipulated image. Then, the learning device 100 may (i) instruct the convolutional layer 122 to generate at least one k-th integrated feature map by applying the convolution operations to the k-th integrated training image, (ii) instruct the RPN 123 to generate each of (k_1)-st object proposals to (k_n)-th object proposals, corresponding to the target objects, in each of the (k_1)-st manipulated image to the (k_n)-th manipulated image included in the k-th integrated training image, by using the k-th integrated feature map, (iii) instruct the pooling layer 124 to apply the pooling operations to each region, corresponding to each of the (k_1)-st object proposals to the (k_n)-th object proposals, on the k-th integrated feature map, to thereby generate at least one k-th pooled integrated feature map, and (iv) instruct the FC layer 125 to apply the fully connected operation to the k-th pooled integrated feature map, to thereby generate (k_1)-st object detection information to (k_n)-th object detection information corresponding to the target objects. Then, the learning device 100 may perform processes of (i) instructing the target object merging network 126 to generate k-th merged object proposals by merging the (k_1)-st object proposals to the (k_n)-th object proposals, and generate k-th merged object detection information by merging the (k__ 1)-st object detection information to the (k_n)-th object detection information, and (ii) instructing the FC loss layer 128 to generate one or more k-th FC losses by referring to the k-th merged object detection information and its corresponding GT, to thereby learn at least part of parameters of the FC layer 125 and the convolutional layer 122 by backpropagating the k-th FC losses. Also, the learning device 100 may instruct the RPN loss layer 129 to generate one or more k-th RPN losses by referring to the k-th merged object proposals and their corresponding GTs, to thereby adjust at least part of the parameters of the RPN 123 by backpropagating the k-th RPN losses.

By using the method above, the objects with various sizes on the frames in the training video, especially the objects in the long distance which are small-sized, are detected efficiently. Also, computational load is reduced since only regions corresponding to the estimated target regions are used and thus computation time of the object detector based on the CNN is reduced.

Also, in the description so far, it is assumed that there is just one target object on the frames in the training video, however, even in case there are multiple target objects on each of the frames in the training video, detection of each of the target objects is possible by using each target region corresponding to each of the target objects on each of the frames as in the method mentioned above.

FIG. 7 is a drawing schematically illustrating a testing device for testing the object detector based on the CNN using the target object merging network and the target region estimating network in accordance with one example embodiment of the present disclosure, and by referring to FIG. 7, the testing device 200 may include a communication part 210 and a processor 220.

First, the communication part 210 may acquire or support another device to acquire at least one test video.

In addition, the testing device may further include a memory 215 capable of storing computer readable instructions for performing following processes. As one example, the processor, the memory, a medium, etc. may be integrated with an integrated processor.

Herein, the object detector based on the CNN using the target object merging network and the target region estimating network may have been learned by the learning method described by referring to FIGS. 1 to 6.

For reference, in the description below, the phrase "for training" is added for terms related to the learning processes, and the phrase "for testing" is added for terms related to testing processes, to avoid possible confusion.

That is, if at least one training video has been acquired, the learning device may have performed processes of (i) instructing the image-manipulating network to generate a (1_1)-st manipulated image for training to a (1_n)-th manipulated image for training corresponding to first estimated target regions for training, where at least one target object for training is estimated as located, on each of a (1_1)-st training image to a (1_n)-th training image included in a first image pyramid for training corresponding to a first frame for training which is a current frame of the training video, and generate a first integrated training image by concatenating the (1_1)-st manipulated image for training to the (1_n)-th manipulated image for training, (ii) instructing the convolutional layers to apply the convolution operations to the first integrated training image, to thereby generate a first feature map for training, instructing the RPN to generate (1_1)-st object proposals for training to (1_n)-th object proposals for training, corresponding to the target object for training located on each of the (1_1)-st manipulated image for training to the (1_n)-th manipulated image for training in the first integrated training image by using the first feature map for training, instructing the pooling layer to generate a first pooled feature map for training by applying the pooling operations to one or more regions, corresponding to the (1_1)-st object proposals for training to the (1_n)-th object proposals for training, on the first feature map for training, and instructing the FC layer to apply the fully connected operation to the first pooled feature map for training, to thereby generate (1_1)-st object detection information for training to (1_n)-th object detection information for training, corresponding to the target object for training, and (iii) instructing the target object merging network to generate first merged object proposals for training by merging the (1_1)-st object proposals for training to the (1_n)-th object proposals for training, and generate first merged object detection information for training by merging the (1_1)-st object detection information for training to the (1_n)-th object detection information for training, and instructing the FC loss layer to calculate one or more first FC losses by referring to the first merged object detection information for training and its corresponding GT, to thereby learn at least part of parameters of the FC layer and the convolutional layers by backpropagating the first FC losses. Then, the learning device may have performed processes of (i) instructing the target object estimating network to search for (k−1)-th target regions for training, where the target object for training is estimated as located, on the (k−1)-th frame for training by referring to {(k−1)_1}-st object proposals for training to {(k−1)_n}-th object proposals for training on a (k−1)-th integrated training image, and instructing the target region estimating network to search for k-th estimated target regions for training, corresponding to one or more regions, where the (k−1)-th target regions for training are estimated as located, on a k-th frame for training, (ii) instructing the image-manipulating network to generate a (k_1)-st manipulated image for training to a (k_n)-th manipulated image for training corresponding to the k-th estimated target regions for training, on each of a (k_1)-st training image to a (k_n)-th training image included in a k-th image pyramid for training corresponding to the k-th frame for training, and generate a k-th integrated training image by concatenating the (k_1)-st manipulated image for training to the (k_n)-th manipulated image for training, (iii) instructing the convolutional layers to apply the convolution operations to the k-th integrated training image, to thereby generate a k-th feature map for training, instructing the RPN to generate (k_1)-st object proposals for training to (k_n)-th object proposals for training, corresponding to the target object for training located on each of the (k_1)-st manipulated image for training to the (k_n)-th manipulated image for training in the k-th integrated training image by using the k-th feature map for training, instructing the pooling layer to generate a k-th pooled feature map for training by applying the pooling operations to one or more regions, corresponding to the (k_1)-st object proposals for training to the (k_n)-th object proposals for training, on the k-th feature map for training, and instructing the FC layer to apply the fully connected operation to the k-th pooled feature map for training, to thereby generate (k_1)-st object detection information for training to (k_n)-th object detection information for training, corresponding to the target object for training, and (iv) instructing the target object merging network to generate k-th merged object proposals for training by merging the (k_1)-st object proposals for training to the (k_n)-th object proposals for training, and generate k-th merged object detection information for training by merging the (k_1)-st object detection information for training to the (k_n)-th object detection information for training, and instructing the FC loss layer to calculate one or more k-th FC losses by referring to the k-th merged object detection information for training and its corresponding GT, to thereby learn at least part of parameters of the FC layer and the convolutional layers by backpropagating the k-th FC losses, by increasing k from 2 to n.

Also, the learning device may have instructed the RPN loss layer to calculate one or more first RPN losses by referring to information on the first merged object proposals for training and their corresponding GTs, to thereby adjust at least part of the parameters of the RPN by backpropagating the first RPN losses, and may have instructed the RPN loss layer to calculate one or more k-th RPN losses by referring to information on the k-th merged object proposals for training and their corresponding GTs, to thereby adjust at least part of the parameters of the RPN by backpropagating the k-th RPN losses.

Then, the processor 220 may perform processes of (i) instructing the image-manipulating network to generate a (1_1)-st manipulated image for testing to a (1_n)-th manipulated image for testing corresponding to first estimated target regions for testing, where at least one target object for testing is estimated as located, on each of a (1_1)-st test image to a (1_n)-th test image included in a first image pyramid for testing corresponding to a first frame for testing which is a current frame of the test video, and generate a first integrated test image by concatenating the (1_1)-st manipulated image for testing to the (1_n)-th manipulated image for testing, (ii) instructing the convolutional layers to apply the convolution operations to the first integrated test image, to thereby generate a first feature map for testing, instructing the RPN to generate (1_1)-st object proposals for testing to (1_n)-th object proposals for testing, corresponding to the target object for testing located on each of the (1_1)-st manipulated image for testing to the (1_n)-th manipulated image for testing in the first integrated test image by using the first feature map for testing, instructing the pooling layer to generate a first pooled feature map for testing by applying the pooling operations to one or more regions, corresponding to the (1_1)-st object proposals for testing to the (1_n)-th object proposals for testing, on the first feature map for testing, and instructing the FC layer to apply the fully connected operation to the first pooled feature map for testing, to thereby generate (1_1)-st object detection information for testing to (1_n)-th object detection information for testing, corresponding to the target object for testing, and (iii) instructing the target object merging network to generate first merged object proposals for testing by merging the (1_1)-st object proposals for testing to the (1_n)-th object proposals for testing, and generate first merged object detection information for testing by merging the (1_1)-st object detection information for testing to the (1_n)-th object detection information for testing. Then, the processor 220 may perform processes of (i) instructing the target object estimating network to search for (k−1)-th target regions for testing, where the target object for testing is estimated as located, on the (k−1)-th frame for testing by referring to {(k−1)_1}-st object proposals for testing to {(k−1)_n}-th object proposals for testing on a (k−1)-th integrated test image, and instructing the target region estimating network to search for k-th estimated target regions for testing, corresponding to one or more regions, where the (k−1)-th target regions for testing are estimated as located, on a k-th frame for testing, (ii) instructing the image-manipulating network to generate a (k_1)-st manipulated image for testing to a (k_n)-th manipulated image for testing corresponding to the k-th estimated target regions for testing, on each of a (k_1)-st test image to a (k_n)-th test image included in a k-th image pyramid for testing corresponding to the k-th frame for testing, and generate a k-th integrated test image by concatenating the (k_1)-st manipulated image for testing to the (k_n)-th manipulated image for testing, (iii) instructing the convolutional layers to apply the convolution operations to the k-th integrated test image, to thereby generate a k-th feature map for testing, instructing the RPN to generate (k_1)-st object proposals for testing to (k_n)-th object proposals for testing, corresponding to the target object for testing located on each of the (k_1)-st manipulated image for testing to the (k_n)-th manipulated image for testing in the k-th integrated test image by using the k-th feature map for testing, instructing the pooling layer to generate a k-th pooled feature map for testing by applying the pooling operations to one or more regions, corresponding to the (k_1)-st object proposals for testing to the (k_n)-th object proposals for testing, on the k-th feature map for testing, and instructing the FC layer to apply the fully connected operation to the k-th pooled feature map for testing, to thereby generate (k_1)-st object detection information for testing to (k_n)-th object detection information for testing, corresponding to the target object for testing, and (iv) instructing the target object merging network to generate k-th merged object proposals for testing by merging the (k_1)-st object proposals for testing to the (k_n)-th object proposals for testing, and generate k-th merged object detection information for testing by merging the (k_1)-st object detection information for testing to the (k_n)-th object detection information for testing, by increasing k from 2 to n.

Herein, the testing device 200 in accordance with one example embodiment of the present disclosure may be a computing device and may be any device with a processor capable of computation. For reference, although FIG. 6 shows the single testing device 200, the scope of the present disclosure is not limited thereto. For example, the testing device may be configured as several devices to perform its functions.

A method for testing the object detector based on the CNN using the target object merging network and the target region estimating network by using the testing device 200 in accordance with one example embodiment of the present disclosure is described by referring to FIG. 8 as follows. In the description below, the part easily deducible from the learning method described by referring to FIGS. 1 to 6 will be omitted.

First, on condition that at least part of parameters of an FC layer 225, a convolutional layer 222, and an RPN 223 has been learned according to the learning method described by referring to FIGS. 1 to 6, if the test video is acquired, the testing device 200 may instruct an image-manipulating network 211 to generate the (1_1)-st manipulated image for testing to the (1_n)-th manipulated image for testing, corresponding to the first estimated target regions for testing, where at least one target object for testing is estimated as located, on each of the (1_1)-st test image to the (1_n)-th test image included in the first image pyramid for testing corresponding to a first frame for testing which is a current frame in the test video.

Herein, the first estimated target regions for testing may be set by the target region estimating network 221 or may be estimated by referring to the (1_1)-st test image to the (1_n)-th test image.

Then, the testing device 200 may instruct the image-manipulating network 211 to generate the first integrated test image by concatenating the (1_1)-st manipulated image for testing to the (1_n)-th manipulated image for testing.

Herein, the testing device 200 may instruct the image-manipulating network 211 to adjust at least one of widths and lengths of the (1_1)-st manipulated image for testing to the (1_n)-th manipulated image for testing to be identical, and concatenate the (1_1)-st adjusted manipulated image for testing to the (1_n)-th adjusted manipulated image for testing in a direction of the widths or the lengths which are adjusted to be identical. As another example, widths of the manipulated images for testing may be adjusted to be identical and then each of the manipulated images for testing may be concatenated by using the adjusted widths, or the widths and the heights are adjusted to be identical and then each of the manipulated images for testing may be concatenated into a large squared shape.

Then, the testing device 200 may instruct the image-manipulating network 211 to add at least one zero padding region in-between each pair comprised of two neighboring adjusted manipulated images for testing which are concatenated, among the (1_1)-st adjusted manipulated image for testing to the (1_n)-th adjusted manipulated image for testing. Herein, the integrated test image may be reduced by a ratio of 1/S by the multiple convolution operations of the convolutional layers, and if a maximum size of each kernel of each of the convolutional layers is KxK, a distance in-between said each pair comprised of the two neighboring adjusted manipulated images for testing may be determined as S×eK−1)/2.

Next, the testing device 200 may instruct the convolutional layer 222 to apply the convolution operations to the first integrated test image, to thereby generate at least one first integrated feature map for testing. Herein, the convolutional layer 222 may be a single convolutional layer or multiple convolutional layers.

Then, the testing device 200 may instruct the RPN 223 to generate one or more (1_1)-st object proposals for testing to one or more (1_n)-th object proposals for testing corresponding to the target objects for testing in the (1_1)-st manipulated image for testing to the (1_n)-th manipulated image for testing included in the first integrated test image by using the first integrated feature map for testing.

Herein, each of the (1_1)-st object proposals for testing to the (1_n)-th object proposals for testing may include information on each proposal box for testing having location information corresponding to each of the target objects for testing, i.e., a tagged area and information on whether it is an object.

Then, the testing device 200 may instruct a pooling layer 224 to apply the pooling operations to each region, corresponding to each of the (1_1)-st object proposals for testing to the (1_n)-th object proposals for testing, on the first integrated feature map for testing, to thereby generate at least one first pooled integrated feature map for testing, and may instruct the FC layer 225 to apply the fully connected operation to the first pooled integrated feature map for testing, to thereby generate (1_1)-st object detection information for testing to (1_n)-th object detection information for testing corresponding to the target objects for testing.

Herein, the (1_1)-st object detection information for testing to the (1_n)-th object detection information for testing may include information on bounding boxes for testing, i.e., location information on each of the target objects for testing, and class information on each of the target objects for testing corresponding to the (1_1)-st object proposals for testing to the (1_n)-th object proposals for testing.

Then the testing device 200 may perform processes of (i) instructing a target object merging network 226 to generate first merged object proposals for testing by merging the (1_1)-st object proposals for testing to the (1_n)-th object proposals for testing, and generate first merged object detection information for testing by merging the (1_1)-st object detection information for testing to the (1_n)-th object detection information for testing. Herein, information on the (1_1)-st object proposals for testing to the (1_n)-th object proposals for testing may be converted to be corresponding to the first frame for testing which is the current frame in the test video.

As one example, as described by referring to FIG. 5, supposing that at least one specific identical object for testing is located on the (1_1)-st manipulated image for testing MI1 and the (1_2)-nd manipulated image for testing MI2, and that at least one object proposal for testing, corresponding to the specific identical object for testing, among the (1_1)-st object proposals for testing on the (1_1)-st manipulated image for testing MI1, is a (1_1)-st specific object proposal for testing PB1, and that at least one object proposal for testing, corresponding to the specific identical object for testing, among the (1_2)-nd object proposals for testing on the (1_2)-nd manipulated image for testing MI2, is a (1_2)-nd specific object proposal for testing PB2, the testing device 200 may instruct the target object merging network 226 to determine whether an IOU for testing between the (1_1)-st specific object proposal for testing PB1 and the (1_2)-nd specific object proposal for testing PB2 is equal to or greater than the first threshold. Herein, the IOU for testing is an intersection over union. Then, if the IOU for testing is determined as less than the first threshold, an adjusted IOU for testing between the (1_1)-st specific object proposal for testing PB1 and the (1_2)-nd specific object proposal for testing PB2 may be calculated.

Herein, the adjusted IOU for testing may be an IOU calculated by referring to intersection(PB1, MI2), i.e., an area, corresponding to the (1_1)-st specific object proposal for testing PB1 on the (1_2)-nd manipulated image for testing MI2 and intersection(PB2, MI1), i.e., an area, corresponding to the (1_2)-nd specific object proposal for testing PB2 on the (1_1)-st manipulated image for testing MI1.

And if the adjusted IOU for testing is determined as equal to or greater than the second threshold, the testing device 200 may select (i) one of a higher probability among the (1_1)-st specific object proposal for testing PB1 and the (1_2)-nd specific object proposal for testing PB2, or (ii) one of a larger area calculated on the first frame for testing which is the current frame in the test video among the (1_1)-st specific object proposal for testing PB1 and the (1_2)-nd specific object proposal for testing PB2, to thereby output the selected one as a specific merged object proposal for testing corresponding to the specific identical object for testing.

However, if the adjusted IOU for testing is determined as less than the second threshold, the testing device 200 may determine that the (1_1)-st specific object proposal for testing PB1 and the (1_2)-nd specific object proposal for testing PB2 respectively correspond to different objects for testing. That is, if the IOU for testing between the (1_1)-st specific object proposal for testing PB1 and the (1_2)-nd specific object proposal for testing PB2 is determined as less than the first threshold and the adjusted IOU for testing between those two is determined as less than the second threshold, the testing device 200 may determine that the (1_1)-st specific object proposal for testing PB1 and the (1_2)-nd specific object proposal for testing PB2 respectively correspond to different objects for testing.

In the meantime, if the IOU for testing between the (1_1)-st specific object proposal for testing PB1 and the (1_2)-nd specific object proposal for testing PB2 is determined as equal to or greater than the first threshold, the testing device may select (i) one of a higher probability among the (1_1)-st specific object proposal for testing PB1 and the (1_2)-nd specific object proposal for testing PB2, or (ii) one of a larger area calculated on each of the manipulated images for testing MI1 and MI2 among the (1_1)-st specific object proposal for testing PB1 and the (1_2)-nd specific object proposal for testing PB2, to thereby output the selected one as the specific merged object proposal for testing corresponding to the specific identical object for testing.

Also, as described by referring to FIG. 5, supposing that at least one specific identical object for testing is located on the (1_1)-st manipulated image for testing MI1 and the (1_2)-nd manipulated image for testing MI2, and that at least one object bounding box for testing, corresponding to the specific identical object for testing, among object bounding boxes for testing included in the (1_1)-st object detection information for testing on the (1_1)-st manipulated image for testing MI1, is a (1_1)-st specific object bounding box for testing BB1, and that at least one object bounding box for testing, corresponding to the specific identical object for testing, among object bounding boxes for testing included in the (1_2)-nd object detection information for testing on the (1_2)-nd manipulated image for testing MI2, is a (1_2)-nd specific object bounding box for testing BB2, the testing device 200 may instruct the target object merging network 226 to determine whether the IOU for testing between the (1_1)-st specific object bounding box for testing BB1 and the (1_2)-nd specific object bounding box for testing BB2 is equal to or greater than the first threshold. Herein, the first threshold used for the IOU for testing between the object proposals for testing and the first threshold used for the IOU for testing between the object bounding boxes for testing may be the same or different. Then, if the IOU for testing between these two bounding boxes for testing is determined as less than the first threshold, an adjusted IOU for testing between the (1_1)-st specific object bounding box for testing BB1 and the (1_2)-nd specific object bounding box for testing BB2 may be calculated.

Herein, the adjusted IOU for testing may be an IOU calculated by referring to intersection(BB1, MI2), i.e., an area, corresponding to the (1_1)-st specific object bounding box for testing BB1 on the (1_2)-nd manipulated image for testing MI2 and intersection(BB2, MI1), i.e., an area, corresponding to the (1_2)-nd specific object bounding box for testing BB2 on the (1_1)-st manipulated image for testing MI1.

And if the adjusted IOU for testing is determined as equal to or greater than the second threshold, the testing device 200 may select (i) one of a higher probability among the (1_1)-st specific object bounding box for testing BB1 and the (1_2)-nd specific object bounding box for testing BB2, or (ii) one of a larger area calculated on the first frame for testing which is the current frame in the test video among the (1_1)-st specific object bounding box for testing BB1 and the (1_2)-nd specific object bounding box for testing BB2, to thereby output the selected one as a specific merged object detection information for testing corresponding to the specific identical object for testing. Herein, the second threshold used for the IOU for testing between the object proposals for testing and the second threshold used for the IOU for testing between the object bounding boxes for testing may be the same or may be different.

However, if the adjusted IOU for testing is determined as less than the second threshold, the testing device 200 may determine that the (1_1)-st specific object bounding box for testing BB1 and the (1_2)-nd specific object bounding box for testing BB2 respectively correspond to different objects for testing. That is, if the IOU for testing between the (1_1)-st specific object bounding box for testing BB1 and the (1_2)-nd specific object bounding box for testing BB2 is determined as less than the first threshold and the adjusted IOU for testing between those two is determined as less than the second threshold, the testing device 200 may determine that the (1_1)-st specific object bounding box for testing BB1 and the (1_2)-nd specific object bounding box for testing BB2 respectively correspond to different objects for testing.

In the meantime, if the IOU for testing between the (1_1)-st specific object bounding box for testing BB1 and the (1_2)-nd specific object bounding box for testing BB2 is determined as equal to or greater than the first threshold, the testing device may select (i) one of a higher probability among the (1_1)-st specific object bounding box for testing BB1 and the (1_2)-nd specific object bounding box for testing BB2, or (ii) one of a larger area calculated on each of the manipulated images for testing MI1 and MI2 among the (1_1)-st specific object bounding box for testing BB1 and the (1_2)-nd specific object bounding box for testing BB2, to thereby output the selected one as the specific merged object detection information for testing corresponding to the specific identical object for testing.

Then, the testing device 200 may instruct a target object estimating network 227 to search for first target regions for testing, corresponding to an area, where the target object for testing is estimated as located, on the (1_1)-st manipulated image for testing to the (1_n)-th manipulated image for testing, by referring to the (1_1)-st object proposals for testing to the (1_n)-th object proposals for testing on the (1_1)-st manipulated image for testing to the (1_n)-th manipulated image for testing.

Then, the testing device 200 may instruct the target region estimating network 221 to search for a second estimated target regions for testing, corresponding to at least one region, where the first target region for testing is estimated as located, on a second frame for testing which is a next frame following the first frame of the test video.

Thereafter, the testing device 200 may instruct the image-manipulating network 211 to generate a (2_1)-st manipulated image for testing to a (2_n)-th manipulated image for testing, corresponding to second estimated target regions for testing, on each of a (2_1)-st tets image to a (2_n)-th test image included in a second image pyramid for testing corresponding to the second frame for testing, and generate a second integrated test image by concatenating the (2_1)-st manipulated image for testing to the (2_n)-th manipulated image for testing, then repeat these processes to efficiently detect the target object for testing on the test video.

In detail, the testing device 200 may perform or support another device to perform processes of (i) instructing the target object estimating network 227 to search for (k−1)-th target regions for testing, where the target object for testing is estimated as located, on a (k−1)-th frame for testing, by referring to {(k−1)_1}-st object proposals for testing to {(k−1)_n}-th object proposals for testing on a (k−1)-th integrated test image, and (ii) instructing the target region estimating network 221 to search for k-th estimated target regions for testing, corresponding to at least one region, where the (k−1)-th target regions for testing are estimated as located, on the k-th frame for testing, by increasing k from 2 to n. Then, the testing device 200 may instruct the image-manipulating network 211 to generate a (k_1)-st manipulated image for testing to a (k_n)-th manipulated image for testing, corresponding to k-th estimated target regions for testing, on each of a (k_1)-st test image to a (k_n)-th test image included in a k-th image pyramid for testing corresponding to a k-th frame for testing, and generate a k-th integrated test image by concatenating the (k_1)-st manipulated image for testing to the (k_n)-th manipulated image for testing. Then, the testing device 200 may (i) instruct the convolutional layer 222 to generate at least one k-th integrated feature map for testing by applying the convolution operations to the k-th integrated test image for testing, (ii) instruct the RPN 223 to generate each of (k_1)-st object proposals for testing to (k_n)-th object proposals for testing, corresponding to the target objects for testing, in each of the (k_1)-st manipulated image for testing to the (k_n)-th manipulated image for testing included in the k-th integrated test image, by using the k-th integrated feature map for testing, (iii) instruct the pooling layer 224 to apply the pooling operations to each region, corresponding to each of the (k_1)-st object proposals for testing to the (k_n)-th object proposals for testing, on the k-th integrated feature map for testing, to thereby generate at least one k-th pooled integrated feature map for testing, and (iv) instruct the FC layer 225 to apply the fully connected operation to the k-th pooled integrated feature map for testing, to thereby generate (k_1)-st object detection information for testing to (k_n)-th object detection information for testing corresponding to the target objects for testing. Then, the testing device 200 may perform processes of (i) instructing the target object merging network 226 to generate k-th merged object proposals for testing by merging the (k_1)-st object proposals for testing to the (k_n)-th object proposals for testing, and generate k-th merged object detection information for testing by merging the (k_1)-st object detection information for testing to the (k_n)-th object detection information for testing.

By using the method above, the objects with various sizes on the frames in the test video, especially the objects in the long distance which are small-sized, are detected efficiently.

Also, computational load is reduced since only regions corresponding to the estimated target regions are used and thus computation time of the object detector based on the CNN is reduced.

Also, in the description so far, it is assumed that there is just one target object on the frames in the test video, however, even in case there are multiple target objects on each of the frames in the test video, detection of each of the target objects is possible by using each target region corresponding to each of the target objects on each of the frames as in the method mentioned above.

The present disclosure has an effect of effectively detecting the objects on the image without regard to their sizes.

The present disclosure has another effect of detecting the objects on the image without additional computational load.

The present disclosure has still another effect of efficiently detecting the objects and reducing computational time of the CNN, by using target regions corresponding to objects with various sizes.

The CNN may be adaptable to customers' requirements such as KPI, and may be redesigned when scales of objects change as a focal length or a resolution changes depending on the KPI. Also, the method can be useful for multi-camera, SVM (surround view monitor), and the like, as accuracy of 2D bounding boxes improves.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for learning parameters of an object detector based on a CNN by using a target object merging network and a target region estimating network, comprising steps of:
(a) a learning device, if at least one training video is acquired, (i) instructing an image-manipulating network to generate a (1_1)-st manipulated image to a (1_n)-th manipulated image corresponding to first estimated target regions, where each of at least one target objects is estimated as located, on each of a (1_1)-st image to a (1_n)-th image included in a first image pyramid corresponding to a first frame which is a current frame of the training video, and generate a first integrated training image by concatenating the (1_1)-st manipulated image to the (1_n)-th manipulated image, (ii) instructing one or more convolutional layers to apply one or more convolution operations to the first integrated training image, to thereby generate a first feature map, instructing an RPN to generate (1_1)-st object proposals to (1_n)-th object proposals, corresponding to the target object located on each of the (1_1)-st manipulated image to the (1_n)-th manipulated image in the first integrated training image by using the first feature map, instructing a pooling layer to generate a first pooled feature map by applying one or more pooling operations to one or more regions, corresponding to the (1_1)-st object proposals to the (1_n)-th object proposals, on the first feature map, and instructing an FC layer to apply at least one fully connected operation to the first pooled feature map, to thereby generate (1_1)-st object detection information to (1_n)-th object detection information, corresponding to the target object, and (iii) instructing the target object merging network to generate first merged object proposals by merging the (1_1)-st object proposals to the (1_n)-th object proposals, and generate first merged object detection information by merging the (1_1)-st object detection information to the (1_n)-th object detection information, and instructing an FC loss layer to calculate one or more first FC losses by referring to the first merged object detection information and its corresponding GT, to thereby learn at least part of parameters of the FC layer and the convolutional layers by backpropagating the first FC losses; and (b) the learning device (i) instructing the target object estimating network to search for (k−1)-th target regions, where the target object is estimated as located, on the (k−1)-th frame by referring to {(k−1)_1}-st object proposals to {(k−1)_n}-th object proposals on a (k−1)-th integrated training image, and instructing the target region estimating network to search for k-th estimated target regions, corresponding to one or more regions, where the (k−1)-th target regions are estimated as located, on a k-th frame, (ii) instructing the image-manipulating network to generate a (k_1)-st manipulated image to a (k_n)-th manipulated image corresponding to the k-th estimated target regions, on each of a (k_1)-st image to a (k_n)-th image included in a k-th image pyramid corresponding to the k-th frame, and generate a k-th integrated training image by concatenating the (k_1)-st manipulated image to the (k_n)-th manipulated image, (iii) instructing the convolutional layers to apply the convolution operations to the k-th integrated training image, to thereby generate a k-th feature map, instructing the RPN to generate (k_1)-st object proposals to (k_n)-th object proposals, corresponding to the target object located on each of the (k_1)-st manipulated image to the (k_n)-th manipulated image in the k-th integrated training image by using the k-th feature map, instructing the pooling layer to generate a k-th pooled feature map by applying the pooling operations to one or more regions, corresponding to the (k_1)-st object proposals to the (k_n)-th object proposals, on the k-th feature map, and instructing the FC layer to apply the fully connected operation to the k-th pooled feature map, to thereby generate (k_1)-st object detection information to (k_n)-th object detection information, corresponding to the target object, and (iv) instructing the target object merging network to generate k-th merged object proposals by merging the (k_1)-st object proposals to the (k_n)-th object proposals, and generate k-th merged object detection information by merging the (k_1)-st object detection information to the (k_n)-th object detection information, and instructing the FC loss layer to calculate one or more k-th FC losses by referring to the k-th merged object detection information and its corresponding GT, to thereby learn at least part of parameters of the FC layer and the convolutional layers by backpropagating the k-th FC losses, by increasing k from 2 to n.

2. The method of claim 1, wherein, at the step of (a), the learning device instructs an RPN loss layer to calculate one or more first RPN losses by referring to information on the first merged object proposals and their corresponding GTs, to thereby adjust at least part of parameters of the RPN by backpropagating the first RPN losses, and wherein, at the step of (b), the learning device instructs the RPN loss layer to calculate one or more k-th RPN losses by referring to information on the k-th merged object proposals and their corresponding GTs, to thereby adjust at least part of the parameters of the RPN by backpropagating the k-th RPN losses.

3. The method of claim 1, wherein, at the step of (a), the learning device instructs the image-manipulating network to adjust at least one of widths and lengths of the (1_1)-st manipulated image to the (1_n)-th manipulated image to be identical, and concatenates the (1_1)-st adjusted manipulated image to the (1_n)-th adjusted manipulated image in a direction of the widths or the lengths which are adjusted to be identical, and wherein, at the step of (b), the learning device instructs the image-manipulating network to adjust at least one of widths and lengths of the (k_1)-st manipulated image to the (k_n)-th manipulated image to be identical, and concatenates the (k_1)-st adjusted manipulated image to the (k_n)-th adjusted manipulated image in a direction of the widths or the lengths which are adjusted to be identical.

4. The method of claim 3, wherein the learning device instructs the image-manipulating network to add at least one zero padding region in-between each pair comprised of two neighboring adjusted manipulated images which are concatenated, among the (k_1)-st adjusted manipulated image to the (kn)-th adjusted manipulated image, and wherein the integrated training image is reduced by a ratio of 1/S by multiple convolution operations of the convolutional layers, and wherein, if a maximum size of each kernel of each of the convolutional layers is K×K, a distance in-between said each pair comprised of the two neighboring adjusted manipulated images is determined as S×(K−1)/2.

5. The method of claim 1, wherein, supposing that at least one specific identical object is located on each of a first specific manipulated image and a second specific manipulated image, and that at least one object proposal, corresponding to the specific identical object, on the first specific manipulated image, is a first specific object proposal, and that at least one object proposal, corresponding to the specific identical object, on the second specific manipulated image, is a second specific object proposal, the learning device instructs the target object merging network to determine whether an IOU between the first specific object proposal and the second specific object proposal is equal to or greater than a first threshold, then (I) if the IOU is determined as less than the first threshold, calculates an adjusted IOU between an area, corresponding to the first specific object proposal, on the second specific manipulated image and an area, corresponding to the second specific object proposal, on the first specific manipulated image, and (II) if the adjusted IOU is determined as equal to or greater than a second threshold, selects (i) one of a higher probability among the first specific object proposal and the second specific object proposal, or (ii) one of a larger area calculated on the training image among the first specific object proposal and the second specific object proposal, to thereby output the selected one as a specific merged object proposal corresponding to the specific identical object, wherein the IOU is an intersection over union.

6. The method of claim 1, wherein, supposing that at least one specific identical object is located on each of a first specific manipulated image and a second specific manipulated image, and that at least one object bounding box, corresponding to the specific identical object, on the first specific manipulated image, is a first specific object bounding box, and that at least one object bounding box, corresponding to the specific identical object, on the second specific manipulated image, is a second specific object bounding box, the learning device instructs the target object merging network to determine whether an IOU between the first specific object bounding box and the second specific object bounding box is equal to or greater than a first threshold, then (I) if the IOU is determined as less than the first threshold, calculates an adjusted IOU between an area, corresponding to the first specific object bounding box, on the second specific manipulated image and an area, corresponding to the second specific object bounding box, on the first specific manipulated image, and (II) if the adjusted IOU is determined as equal to or greater than a second threshold, selects (i) one of a higher probability among the first specific object bounding box and the second specific object bounding box, or (ii) one of a larger area calculated on the training image among the first specific object bounding box and the second specific object bounding box, to thereby output the selected one as a specific merged object detection information corresponding to the specific identical object, wherein the IOU is an intersection over union.

7. The method of claim 1, wherein, at the step of (b), the learning device instructs the target object estimating network to (i) divide a specific manipulated image into an M×N grid, (ii) generate at least one histogram map representing the number of each of corresponding specific object proposals, among the (k_1)-st object proposals to the (k_n)-th object proposals, per each cell of the grid, wherein each partial area or each whole area of said each of corresponding specific proposals is present in its corresponding cell of the grid, and (iii) determine at least one specific target region by using at least one region of a moving window, wherein the at least one region has a largest value of summation of the histogram map among all regions to be occupied by changing a location of the moving window.

8. A method for testing an object detector based on a CNN by using a target object merging network and a target region estimating network, comprising steps of:

(a) on condition that a learning device has performed processes of (1) (i) instructing an image-manipulating network to generate a (1_1)-st manipulated image for training to a (1_n)-th manipulated image for training corresponding to first estimated target regions for training, where each of at least one target objects for training is estimated as located, on each of a (1_1)-st training image to a (1_n)-th training image included in a first image pyramid for training corresponding to a first frame for training which is a current frame of at least one training video, and generate a first integrated training image by concatenating the (1_1)-st manipulated image for training to the (1_n)-th manipulated image for training, (ii) instructing one or more convolutional layers to apply one or more convolution operations to the first integrated training image, to thereby generate a first feature map for training, instructing an RPN to generate (1_1)-st object proposals for training to (1_n)-th object proposals for training, corresponding to the target object for training located on each of the (1_1)-st manipulated image for training to the (1_n)-th manipulated image for training in the first integrated training image by using the first feature map for training, instructing a pooling layer to generate a first pooled feature map for training by applying one or more pooling operations to one or more regions, corresponding to the (1_1)-st object proposals for training to the (1_n)-th object proposals for training, on the first feature map for training, and instructing an FC layer to apply at least one fully connected operation to the first pooled feature map for training, to thereby generate (1_1)-st object detection information for training to (1_n)-th object detection information for training, corresponding to the target object for training, and (iii) instructing the target object merging network to generate first merged object proposals for training by merging the (1_1)-st object proposals for training to the (1_n)-th object proposals for training, and generate first merged object detection information for training by merging the (1_1)-st object detection information for training to the (1_n)-th object detection information for training, and instructing an FC loss layer to calculate one or more first FC losses by referring to the first merged object detection information for training and its corresponding GT, to thereby learn at least part of parameters of the FC layer and the convolutional layers by backpropagating the first FC losses, and (2) (i) instructing the target object estimating network to search for (k−1)-th target regions for training, where the target object for training is estimated as located, on the (k−1)-th frame for training by referring to {(k−1)_1}-st object proposals for training to {(k−1)_n}-th object proposals for training on a (k−1)-th integrated training image, and instructing the target region estimating network to search for k-th estimated target regions for training, corresponding to one or more regions, where the (k−1)-th target regions for training are estimated as located, on a k-th frame for training, (ii) instructing the image-manipulating network to generate a (k_1)-st manipulated image for training to a (k_n)-th manipulated image for training corresponding to the k-th estimated target regions for training, on each of a (k_1)-st training image to a (k_n)-th training image included in a k-th image pyramid for training corresponding to the k-th frame for training, and generate a k-th integrated training image by concatenating the (k_1)-st manipulated image for training to the (k_n)-th manipulated image for training, (iii) instructing the convolutional layers to apply the convolution operations to the k-th integrated training image, to thereby generate a k-th feature map for training, instructing the RPN to generate (k_1)-st object proposals for training to (k_n)-th object proposals for training, corresponding to the target object for training located on each of the (k_1)-st manipulated image for training to the (k_n)-th manipulated image for training in the k-th integrated training image by using the k-th feature map for training, instructing the pooling layer to generate a k-th pooled feature map for training by applying the pooling operations to one or more regions, corresponding to the (k_1)-st object proposals for training to the (k_n)-th object proposals for training, on the k-th feature map for training, and instructing the FC layer to apply the fully connected operation to the k-th pooled feature map for training, to thereby generate (k_1)-st object detection information for training to (k_n)-th object detection information for training, corresponding to the target object for training, and (iv) instructing the target object merging network to generate k-th merged object proposals for training by merging the (k_1)-st object proposals for training to the (k_n)-th object proposals for training, and generate k-th merged object detection information for training by merging the (k_1)-st object detection information for training to the (k_n)-th object detection information for training, and instructing the FC loss layer to calculate one or more k-th FC losses by referring to the k-th merged object detection information for training and its corresponding GT, to thereby learn at least part of parameters of the FC layer and the convolutional layers by backpropagating the k-th FC losses, by increasing k from 2 to n; a testing device, if at least one test video is acquired, (i) instructing the image-manipulating network to generate a (1_1)-st manipulated image for testing to a (1_n)-th manipulated image for testing corresponding to first estimated target regions for testing, where each of at least one target objects for testing is estimated as located, on each of a (1_1)-st test image to a (1_n)-th test image included in a first image pyramid for testing corresponding to a first frame for testing which is a current frame of the test video, and generate a first integrated test image by concatenating the (1_1)-st manipulated image for testing to the (1_n)-th manipulated image for testing, (ii) instructing the convolutional layers to apply the convolution operations to the first integrated test image, to thereby generate a first feature map for testing, instructing the RPN to generate (1_1)-st object proposals for testing to (1_n)-th object proposals for testing, corresponding to the target object for testing located on each of the (1_1)-st manipulated image for testing to the (1_n)-th manipulated image for testing in the first integrated test image by using the first feature map for testing, instructing the pooling layer to generate a first pooled feature map for testing by applying the pooling operations to one or more regions, corresponding to the (1_1)-st object proposals for testing to the (1_n)-th object proposals for testing, on the first feature map for testing, and instructing the FC layer to apply the fully connected operation to the first pooled feature map for testing, to thereby generate (1_1)-st object detection information for testing to (1_n)-th object detection information for testing, corresponding to the target object for testing, and (iii) instructing the target object merging network to generate first merged object proposals for testing by merging the (1_1)-st object proposals for testing to the (1_n)-th object proposals for testing, and generate first merged object detection information for testing by merging the (1_1)-st object detection information for testing to the (1_n)-th object detection information for testing; and (b) the testing device (i) instructing the target object estimating network to search for (k−1)-th target regions for testing, where the target object for testing is estimated as located, on the (k−1)-th frame for testing by referring to {(k−1)_1}-st object proposals for testing to {(k−1)_n}-th object proposals for testing on a (k−1)-th integrated test image, and instructing the target region estimating network to search for k-th estimated target regions for testing, corresponding to one or more regions, where the (k−1)-th target regions for testing are estimated as located, on a k-th frame for testing, (ii) instructing the image-manipulating network to generate a (k_1)-st manipulated image for testing to a (k_n)-th manipulated image for testing corresponding to the k-th estimated target regions for testing, on each of a (k_1)-st test image to a (k_n)-th test image included in a k-th image pyramid for testing corresponding to the k-th frame for testing, and generate a k-th integrated test image by concatenating the (k_1)-st manipulated image for testing to the (k_n)-th manipulated image for testing, (iii) instructing the convolutional layers to apply the convolution operations to the k-th integrated test image, to thereby generate a k-th feature map for testing, instructing the RPN to generate (k_1)-st object proposals for testing to (k_n)-th object proposals for testing, corresponding to the target object for testing located on each of the (k_1)-st manipulated image for testing to the (k_n)-th manipulated image for testing in the k-th integrated test image by using the k-th feature map for testing, instructing the pooling layer to generate a k-th pooled feature map for testing by applying the pooling operations to one or more regions, corresponding to the (k_1)-st object proposals for testing to the (k_n)-th object proposals for testing, on the k-th feature map for testing, and instructing the FC layer to apply the fully connected operation to the k-th pooled feature map for testing, to thereby generate (k_1)-st object detection information for testing to (k_n)-th object detection information for testing, corresponding to the target object for testing, and (iv) instructing the target object merging network to generate k-th merged object proposals for testing by merging the (k_1)-st object proposals for testing to the (k_n)-th object proposals for testing, and generate k-th merged object detection information for testing by merging the (k_1)-st object detection information for testing to the (k_n)-th object detection information for testing, by increasing k from 2 to n.

9. The method of claim 8, wherein, at the process of (1), the learning device has instructed an RPN loss layer to calculate one or more first RPN losses by referring to information on the first merged object proposals and their corresponding GTs, to thereby adjust at least part of parameters of the RPN by backpropagating the first RPN losses, and wherein, at the process of (2), the learning device has instructed the RPN loss layer to calculate one or more k-th RPN losses by referring to information on the k-th merged object proposals and their corresponding GTs, to thereby adjust at least part of the parameters of the RPN by backpropagating the k-th RPN losses.

10. The method of claim 8, wherein, at the step of (a), the testing device instructs the image-manipulating network to adjust at least one of widths and lengths of the (1_1)-st manipulated image for testing to the (1_n)-th manipulated image for testing to be identical, and concatenates the (1_1)-st adjusted manipulated image for testing to the (1_n)-th adjusted manipulated image for testing in a direction of the widths or the lengths which are adjusted to be identical, and wherein, at the step of (b), the testing device instructs the image-manipulating network to adjust at least one of widths and lengths of the (k_1)-st manipulated image for testing to the (k_n)-th manipulated image for testing to be identical, and concatenates the (k_1)-st adjusted manipulated image for testing to the (k_n)-th adjusted manipulated image for testing in a direction of the widths or the lengths which are adjusted to be identical.

11. The method of claim 10, wherein the testing device instructs the image-manipulating network to add at least one zero padding region in-between each pair comprised of two neighboring adjusted manipulated images for testing which are concatenated, among the (k_1)-st adjusted manipulated image for testing to the (k_n)-th adjusted manipulated image for testing, and wherein the integrated test image is reduced by a ratio of 1/S by multiple convolution operations of the convolutional layers, and wherein, if a maximum size of each kernel of each of the convolutional layers is K×K, a distance in-between said each pair comprised of the two neighboring adjusted manipulated images for testing is determined as S×(K−1)/2.

12. The method of claim 8, wherein, supposing that at least one specific identical object for testing is located on each of a first specific manipulated image for testing and a second specific manipulated image for testing, and that at least one object proposal for testing, corresponding to the specific identical object for testing, on the first specific manipulated image for testing, is a first specific object proposal for testing, and that at least one object proposal for testing, corresponding to the specific identical object for testing, on the second specific manipulated image for testing, is a second specific object proposal for testing, the testing device instructs the target object merging network to determine whether an IOU for testing between the first specific object proposal for testing and the second specific object proposal for testing is equal to or greater than a first threshold, then (I) if the IOU for testing is determined as less than the first threshold, calculates an adjusted IOU for testing between an area, corresponding to the first specific object proposal for testing, on the second specific manipulated image for testing and an area, corresponding to the second specific object proposal for testing, on the first specific manipulated image for testing, and (II) if the adjusted IOU for testing is determined as equal to or greater than a second threshold, selects (i) one of a higher probability among the first specific object proposal for testing and the second specific object proposal for testing, or (ii) one of a larger area calculated on the test image among the first specific object proposal for testing and the second specific object proposal for testing, to thereby output the selected one as a specific merged object proposal for testing corresponding to the specific identical object for testing, wherein the IOU for testing is an intersection over union.

13. The method of claim 8, wherein, supposing that at least one specific identical object for testing is located on each of a first specific manipulated image for testing and a second specific manipulated image for testing, and that at least one object bounding box for testing, corresponding to the specific identical object for testing, on the first specific manipulated image for testing, is a first specific object bounding box for testing, and that at least one object bounding box for testing, corresponding to the specific identical object for testing, on the second specific manipulated image for testing, is a second specific object bounding box for testing, the testing device instructs the target object merging network to determine whether an IOU for testing between the first specific object bounding box for testing and the second specific object bounding box for testing is equal to or greater than a first threshold, then (I) if the IOU for testing is determined as less than the first threshold, calculates an adjusted IOU for testing between an area, corresponding to the first specific object bounding box for testing, on the second specific manipulated image for testing and an area, corresponding to the second specific object bounding box for testing, on the first specific manipulated image for testing, and (II) if the adjusted IOU for testing is determined as equal to or greater than a second threshold, selects (i) one of a higher probability among the first specific object bounding box for testing and the second specific object bounding box for testing, or (ii) one of a larger area calculated on the test image among the first specific object bounding box for testing and the second specific object bounding box for testing, to thereby output the selected one as a specific merged object detection information for testing corresponding to the specific identical object for testing, wherein the IOU for testing is an intersection over union.

14. The method of claim 8, wherein, at the step of (b), the testing device instructs the target object estimating network to (i) divide a specific manipulated image for testing into an M×N grid, (ii) generate at least one histogram map for testing representing the number of each of corresponding specific object proposals for testing, among the (k_1)-st object proposals for testing to the (k_n)-th object proposals for testing, per each cell of the grid, wherein each partial area or each whole area of said each of corresponding specific proposals for testing is present in its corresponding cell of the grid, and (iii) determine at least one specific target region for testing by using at least one region of a moving window for testing, wherein the at least one region has a largest value of summation of the histogram map for testing among all regions to be occupied by changing a location of the moving window for testing.

15. A learning device for learning parameters of an object detector based on a CNN by using a target object merging network and a target region estimating network, comprising:

at least one memory that stores instructions; and at least one processor configured to execute the instructions to: perform processes of (I) (i) instructing an image-manipulating network to generate a (1_1)-st manipulated image to a (1_n)-th manipulated image corresponding to first estimated target regions, where each of at least one target objects is estimated as located, on each of a (1_1)-st image to a (1_n)-th image included in a first image pyramid corresponding to a first frame which is a current frame of at least one training video, and generate a first integrated training image by concatenating the (1_1)-st manipulated image to the (1_n)-th manipulated image, (ii) instructing one or more convolutional layers to apply one or more convolution operations to the first integrated training image, to thereby generate a first feature map, instructing an RPN to generate (1_1)-st object proposals to (1_n)-th object proposals, corresponding to the target object located on each of the (1_1)-st manipulated image to the (1_n)-th manipulated image in the first integrated training image by using the first feature map, instructing a pooling layer to generate a first pooled feature map by applying one or more pooling operations to one or more regions, corresponding to the (1_1)-st object proposals to the (1_n)-th object proposals, on the first feature map, and instructing an FC layer to apply at least one fully connected operation to the first pooled feature map, to thereby generate (1_1)-st object detection information to (1_n)-th object detection information, corresponding to the target object, and (iii) instructing the target object merging network to generate first merged object proposals by merging the (1_1)-st object proposals to the (1_n)-th object proposals, and generate first merged object detection information by merging the (1_1)-st object detection information to the (1_n)-th object detection information, and instructing an FC loss layer to calculate one or more first FC losses by referring to the first merged object detection information and its corresponding GT, to thereby learn at least part of parameters of the FC layer and the convolutional layers by backpropagating the first FC losses, and (II) (i) instructing the target object estimating network to search for (k−1)-th target regions, where the target object is estimated as located, on the (k−1)-th frame by referring to {(k−1)_1}-st object proposals to {(k−1)_n}-th object proposals on a (k−1)-th integrated training image, and instructing the target region estimating network to search for k-th estimated target regions, corresponding to one or more regions, where the (k−1)-th target regions are estimated as located, on a k-th frame, (ii) instructing the image-manipulating network to generate a (k_1)-st manipulated image to a (k_n)-th manipulated image corresponding to the k-th estimated target regions, on each of a (k_1)-st image to a (k_n)-th image included in a k-th image pyramid corresponding to the k-th frame, and generate a k-th integrated training image by concatenating the (k_1)-st manipulated image to the (k_n)-th manipulated image, (iii) instructing the convolutional layers to apply the convolution operations to the k-th integrated training image, to thereby generate a k-th feature map, instructing the RPN to generate (k_1)-st object proposals to (k_n)-th object proposals, corresponding to the target object located on each of the (k_1)-st manipulated image to the (k_n)-th manipulated image in the k-th integrated training image by using the k-th feature map, instructing the pooling layer to generate a k-th pooled feature map by applying the pooling operations to one or more regions, corresponding to the (k_1)-st object proposals to the (k_n)-th object proposals, on the k-th feature map, and instructing the FC layer to apply the fully connected operation to the k-th pooled feature map, to thereby generate (k_1)-st object detection information to (k_n)-th object detection information, corresponding to the target object, and (iv) instructing the target object merging network to generate k-th merged object proposals by merging the (k_1)-st object proposals to the (k_n)-th object proposals, and generate k-th merged object detection information by merging the (k_1)-st object detection information to the (k_n)-th object detection information, and instructing the FC loss layer to calculate one or more k-th FC losses by referring to the k-th merged object detection information and its corresponding GT, to thereby learn at least part of parameters of the FC layer and the convolutional layers by backpropagating the k-th FC losses, by increasing k from 2 to n.

16. The learning device of claim 15, wherein, at the process of (I), the processor instructs an RPN loss layer to calculate one or more first RPN losses by referring to information on the first merged object proposals and their corresponding GTs, to thereby adjust at least part of parameters of the RPN by backpropagating the first RPN losses, and wherein, at the process of (II), the processor instructs the RPN loss layer to calculate one or more k-th RPN losses by referring to information on the k-th merged object proposals and their corresponding GTs, to thereby adjust at least part of the parameters of the RPN by backpropagating the k-th RPN losses.

17. The learning device of claim 15, wherein, at the process of (I), the processor instructs the image-manipulating network to adjust at least one of widths and lengths of the (1_1)-st manipulated image to the (1_n)-th manipulated image to be identical, and concatenates the (1_1)-st adjusted manipulated image to the (1_n)-th adjusted manipulated image in a direction of the widths or the lengths which are adjusted to be identical, and wherein, at the process of (II), the processor instructs the image-manipulating network to adjust at least one of widths and lengths of the (k_1)-st manipulated image to the (k_n)-th manipulated image to be identical, and concatenates the (k_1)-st adjusted manipulated image to the (k_n)-th adjusted manipulated image in a direction of the widths or the lengths which are adjusted to be identical.

18. The learning device of claim 17, wherein the processor instructs the image-manipulating network to add at least one zero padding region in-between each pair comprised of two neighboring adjusted manipulated images which are concatenated, among the (k_1)-st adjusted manipulated image to the (k_n)-th adjusted manipulated image, and wherein the integrated training image is reduced by a ratio of 1/S by multiple convolution operations of the convolutional layers, and wherein, if a maximum size of each kernel of each of the convolutional layers is K×K, a distance in-between said each pair comprised of the two neighboring adjusted manipulated images is determined as S×(K−1)/2.

19. The learning device of claim 15, wherein, supposing that at least one specific identical object is located on each of a first specific manipulated image and a second specific manipulated image, and that at least one object proposal, corresponding to the specific identical object, on the first specific manipulated image, is a first specific object proposal, and that at least one object proposal, corresponding to the specific identical object, on the second specific manipulated image, is a second specific object proposal, the processor instructs the target object merging network to determine whether an IOU between the first specific object proposal and the second specific object proposal is equal to or greater than a first threshold, then (i) if the IOU is determined as less than the first threshold, calculates an adjusted IOU between an area, corresponding to the first specific object proposal, on the second specific manipulated image and an area, corresponding to the second specific object proposal, on the first specific manipulated image, and (ii) if the adjusted IOU is determined as equal to or greater than a second threshold, selects one of a higher probability among the first specific object proposal and the second specific object proposal, or one of a larger area calculated on the training image among the first specific object proposal and the second specific object proposal, to thereby output the selected one as a specific merged object proposal corresponding to the specific identical object, wherein the IOU is an intersection over union.

20. The learning device of claim 15, wherein, supposing that at least one specific identical object is located on each of a first specific manipulated image and a second specific manipulated image, and that at least one object bounding box, corresponding to the specific identical object, on the first specific manipulated image, is a first specific object bounding box, and that at least one object bounding box, corresponding to the specific identical object, on the second specific manipulated image, is a second specific object bounding box, the processor instructs the target object merging network to determine whether an IOU between the first specific object bounding box and the second specific object bounding box is equal to or greater than a first threshold, then (i) if the IOU is determined as less than the first threshold, calculates an adjusted IOU between an area, corresponding to the first specific object bounding box, on the second specific manipulated image and an area, corresponding to the second specific object bounding box, on the first specific manipulated image, and (ii) if the adjusted IOU is determined as equal to or greater than a second threshold, selects one of a higher probability among the first specific object bounding box and the second specific object bounding box, or one of a larger area calculated on the training image among the first specific object bounding box and the second specific object bounding box, to thereby output the selected one as a specific merged object detection information corresponding to the specific identical object, wherein the IOU is an intersection over union.

21. The learning device of claim 15, wherein, at the process of (II), the processor instructs the target object estimating network to (i) divide a specific manipulated image into an M×N grid, (ii) generate at least one histogram map representing the number of each of corresponding specific object proposals, among the (k_1)-st object proposals to the (k_n)-th object proposals, per each cell of the grid, wherein each partial area or each whole area of said each of corresponding specific proposals is present in its corresponding cell of the grid, and (iii) determine at least one specific target region by using at least one region of a moving window, wherein the at least one region has a largest value of summation of the histogram map among all regions to be occupied by changing a location of the moving window.

22. A testing device for testing an object detector based on a CNN by using a target object merging network and a target region estimating network, comprising:

at least one memory that stores instructions; and at least one processor, on condition that a learning device has performed processes of (1) (i) instructing an image-manipulating network to generate a (1_1)-st manipulated image for training to a (1_n)-th manipulated image for training corresponding to first estimated target regions for training, where each of at least one target objects for training is estimated as located, on each of a (1_1)-st training image to a (1_n)-th training image included in a first image pyramid for training corresponding to a first frame for training which is a current frame of at least one training video, and generate a first integrated training image by concatenating the (1_1)-st manipulated image for training to the (1_n)-th manipulated image for training, (ii) instructing one or more convolutional layers to apply one or more convolution operations to the first integrated training image, to thereby generate a first feature map for training, instructing an RPN to generate (1_1)-st object proposals for training to (1_n)-th object proposals for training, corresponding to the target object for training located on each of the (1_1)-st manipulated image for training to the (1_n)-th manipulated image for training in the first integrated training image by using the first feature map for training, instructing a pooling layer to generate a first pooled feature map for training by applying one or more pooling operations to one or more regions, corresponding to the (1_1)-st object proposals for training to the (1_n)-th object proposals for training, on the first feature map for training, and instructing an FC layer to apply at least one fully connected operation to the first pooled feature map for training, to thereby generate (1_1)-st object detection information for training to (1_n)-th object detection information for training, corresponding to the target object for training, and (iii) instructing the target object merging network to generate first merged object proposals for training by merging the (1_1)-st object proposals for training to the (1_n)-th object proposals for training, and generate first merged object detection information for training by merging the (1_1)-st object detection information for training to the (1_n)-th object detection information for training, and instructing an FC loss layer to calculate one or more first FC losses by referring to the first merged object detection information for training and its corresponding GT, to thereby learn at least part of parameters of the FC layer and the convolutional layers by backpropagating the first FC losses, and (2) (i) instructing the target object estimating network to search for (k−1)-th target regions for training, where the target object for training is estimated as located, on the (k−1)-th frame for training by referring to {(k−1)_1}-st object proposals for training to {(k−1)_n}-th object proposals for training on a (k−1)-th integrated training image, and instructing the target region estimating network to search for k-th estimated target regions for training, corresponding to one or more regions, where the (k−1)-th target regions for training are estimated as located, on a k-th frame for training, (ii) instructing the image-manipulating network to generate a (k_1)-st manipulated image for training to a (k_n)-th manipulated image for training corresponding to the k-th estimated target regions for training, on each of a (k_1)-st training image to a (k_n)-th training image included in a k-th image pyramid for training corresponding to the k-th frame for training, and generate a k-th integrated training image by concatenating the (k_1)-st manipulated image for training to the (k_n)-th manipulated image for training, (iii) instructing the convolutional layers to apply the convolution operations to the k-th integrated training image, to thereby generate a k-th feature map for training, instructing the RPN to generate (k_1)-st object proposals for training to (k_n)-th object proposals for training, corresponding to the target object for training located on each of the (k_1)-st manipulated image for training to the (k_n)-th manipulated image for training in the k-th integrated training image by using the k-th feature map for training, instructing the pooling layer to generate a k-th pooled feature map for training by applying the pooling operations to one or more regions, corresponding to the (k_1)-st object proposals for training to the (k_n)-th object proposals for training, on the k-th feature map for training, and instructing the FC layer to apply the fully connected operation to the k-th pooled feature map for training, to thereby generate (k_1)-st object detection information for training to (k_n)-th object detection information for training, corresponding to the target object for training, and (iv) instructing the target object merging network to generate k-th merged object proposals for training by merging the (k_1)-st object proposals for training to the (k_n)-th object proposals for training, and generate k-th merged object detection information for training by merging the (k_1)-st object detection information for training to the (k_n)-th object detection information for training, and instructing the FC loss layer to calculate one or more k-th FC losses by referring to the k-th merged object detection information for training and its corresponding GT, to thereby learn at least part of parameters of the FC layer and the convolutional layers by backpropagating the k-th FC losses, by increasing k from 2 to n; configured to execute the instructions to: perform processes of (I) (i) instructing the image-manipulating network to generate a (1_1)-st manipulated image for testing to a (1_n)-th manipulated image for testing corresponding to first estimated target regions for testing, where each of at least one target objects for testing is estimated as located, on each of a (1_1)-st test image to a (1_n)-th test image included in a first image pyramid for testing corresponding to a first frame for testing which is a current frame of at least one test video, and generate a first integrated test image by concatenating the (1_1)-st manipulated image for testing to the (1_n)-th manipulated image for testing, (ii) instructing the convolutional layers to apply the convolution operations to the first integrated test image, to thereby generate a first feature map for testing, instructing the RPN to generate (1_1)-st object proposals for testing to (1_n)-th object proposals for testing, corresponding to the target object for testing located on each of the (1_1)-st manipulated image for testing to the (1_n)-th manipulated image for testing in the first integrated test image by using the first feature map for testing, instructing the pooling layer to generate a first pooled feature map for testing by applying the pooling operations to one or more regions, corresponding to the (1_1)-st object proposals for testing to the (1_n)-th object proposals for testing, on the first feature map for testing, and instructing the FC layer to apply the fully connected operation to the first pooled feature map for testing, to thereby generate (1_1)-st object detection information for testing to (1_n)-th object detection information for testing, corresponding to the target object for testing, and (iii) instructing the target object merging network to generate first merged object proposals for testing by merging the (1_1)-st object proposals for testing to the (1_n)-th object proposals for testing, and generate first merged object detection information for testing by merging the (1_1)-st object detection information for testing to the (1_n)-th object detection information for testing, and (II) (i) instructing the target object estimating network to search for (k−1)-th target regions for testing, where the target object for testing is estimated as located, on the (k−1)-th frame for testing by referring to {(k−1)_1}-st object proposals for testing to {(k−1)_n}-th object proposals for testing on a (k−1)-th integrated test image, and instructing the target region estimating network to search for k-th estimated target regions for testing, corresponding to one or more regions, where the (k−1)-th target regions for testing are estimated as located, on a k-th frame for testing, (ii) instructing the image-manipulating network to generate a (k_1)-st manipulated image for testing to a (k_n)-th manipulated image for testing corresponding to the k-th estimated target regions for testing, on each of a (k_1)-st test image to a (k_n)-th test image included in a k-th image pyramid for testing corresponding to the k-th frame for testing, and generate a k-th integrated test image by concatenating the (k_1)-st manipulated image for testing to the (k_n)-th manipulated image for testing, (iii) instructing the convolutional layers to apply the convolution operations to the k-th integrated test image, to thereby generate a k-th feature map for testing, instructing the RPN to generate (k_1)-st object proposals for testing to (k_n)-th object proposals for testing, corresponding to the target object for testing located on each of the (k_1)-st manipulated image for testing to the (k_n)-th manipulated image for testing in the k-th integrated test image by using the k-th feature map for testing, instructing the pooling layer to generate a k-th pooled feature map for testing by applying the pooling operations to one or more regions, corresponding to the (k_1)-st object proposals for testing to the (k_n)-th object proposals for testing, on the k-th feature map for testing, and instructing the FC layer to apply the fully connected operation to the k-th pooled feature map for testing, to thereby generate (k_1)-st object detection information for testing to (k_n)-th object detection information for testing, corresponding to the target object for testing, and (iv) instructing the target object merging network to generate k-th merged object proposals for testing by merging the (k_1)-st object proposals for testing to the (k_n)-th object proposals for testing, and generate k-th merged object detection information for testing by merging the (k_1)-st object detection information for testing to the (k_n)-th object detection information for testing, by increasing k from 2 to n.

23. The testing device of claim 22, wherein, at the process of (1), the learning device has instructed an RPN loss layer to calculate one or more first RPN losses by referring to information on the first merged object proposals and their corresponding GTs, to thereby adjust at least part of parameters of the RPN by backpropagating the first RPN losses, and wherein, at the process of (2), the learning device has instructed the RPN loss layer to calculate one or more k-th RPN losses by referring to information on the k-th merged object proposals and their corresponding GTs, to thereby adjust at least part of the parameters of the RPN by backpropagating the k-th RPN losses.

24. The testing device of claim 22, wherein, at the process of (I), the processor instructs the image-manipulating network to adjust at least one of widths and lengths of the (1_1)-st manipulated image for testing to the (1_n)-th manipulated image for testing to be identical, and concatenates the (1_1)-st adjusted manipulated image for testing to the (1_n)-th adjusted manipulated image for testing in a direction of the widths or the lengths which are adjusted to be identical, and wherein, at the process of (II), the processor instructs the image-manipulating network to adjust at least one of widths and lengths of the (k_1)-st manipulated image for testing to the (k_n)-th manipulated image for testing to be identical, and concatenates the (k_1)-st adjusted manipulated image for testing to the (k_n)-th adjusted manipulated image for testing in a direction of the widths or the lengths which are adjusted to be identical.

25. The testing device of claim 24, wherein the processor instructs the image-manipulating network to add at least one zero padding region in-between each pair comprised of two neighboring adjusted manipulated images for testing which are concatenated, among the (k_1)-st adjusted manipulated image for testing to the (k_n)-th adjusted manipulated image for testing, and
wherein the integrated test image is reduced by a ratio of 1/S by multiple convolution operations of the convolutional layers, and wherein, if a maximum size of each kernel of each of the convolutional layers is K×K, a distance in-between said each pair comprised of the two neighboring adjusted manipulated images for testing is determined as S×(K−1)/2.

26. The testing device of claim 22, wherein, supposing that at least one specific identical object for testing is located on each of a first specific manipulated image for testing and a second specific manipulated image for testing, and that at least one object proposal for testing, corresponding to the specific identical object for testing, on the first specific manipulated image for testing, is a first specific object proposal for testing, and that at least one object proposal for testing, corresponding to the specific identical object for testing, on the second specific manipulated image for testing, is a second specific object proposal for testing,
the processor instructs the target object merging network to determine whether an IOU for testing between the first specific object proposal for testing and the second specific object proposal for testing is equal to or greater than a first threshold, then (i) if the IOU for testing is determined as less than the first threshold, calculates an adjusted IOU for testing between an area, corresponding to the first specific object proposal for testing, on the second specific manipulated image for testing and an area, corresponding to the second specific object proposal for testing, on the first specific manipulated image for testing, and (ii) if the adjusted IOU for testing is determined as equal to or greater than a second threshold, selects one of a higher probability among the first specific object proposal for testing and the second specific object proposal for testing, or one of a larger area calculated on the test image among the first specific object proposal for testing and the second specific object proposal for testing, to thereby output the selected one as a specific merged object proposal for testing corresponding to the specific identical object for testing, wherein the IOU for testing is an intersection over union.

27. The testing device of claim 22, wherein, supposing that at least one specific identical object for testing is located on each of a first specific manipulated image for testing and a second specific manipulated image for testing, and that at least one object bounding box for testing, corresponding to the specific identical object for testing, on the first specific manipulated image for testing, is a first specific object bounding box for testing, and that at least one object bounding box for testing, corresponding to the specific identical object for testing, on the second specific manipulated image for testing, is a second specific object bounding box for testing,
the processor instructs the target object merging network to determine whether an IOU for testing between the first specific object bounding box for testing and the second specific object bounding box for testing is equal to or greater than a first threshold, then (i) if the IOU for testing is determined as less than the first threshold, calculates an adjusted IOU for testing between an area, corresponding to the first specific object bounding box for testing, on the second specific manipulated image for testing and an area, corresponding to the second specific object bounding box for testing, on the first specific manipulated image for testing, and (ii) if the adjusted IOU for testing is determined as equal to or greater than a second threshold, selects one of a higher probability among the first specific object bounding box for testing and the second specific object bounding box for testing, or one of a larger area calculated on the test image among the first specific object bounding box for testing and the second specific object bounding box for testing, to thereby output the selected one as a specific merged object detection information for testing corresponding to the specific identical object for testing, wherein the IOU for testing is an intersection over union.

28. The testing device of claim 22, wherein, at the process of (II), the processor instructs the target object estimating network to (i) divide a specific manipulated image for testing into an M×N grid, (ii) generate at least one histogram map for testing representing the number of each of corresponding specific object proposals for testing, among the (k_1)-st object proposals for testing to the (k_n)-th object proposals for testing, per each cell of the grid, wherein each partial area or each whole area of said each of corresponding specific proposals for testing is present in its corresponding cell of the grid, and (iii) determine at least one specific target region for testing by using at least one region of a moving window for testing, wherein the at least one region has a largest value of summation of the histogram map for testing among all regions to be occupied by changing a location of the moving window for testing.

* * * * *